(12) United States Patent
Kajimoto et al.

(10) Patent No.: US 8,682,046 B2
(45) Date of Patent: Mar. 25, 2014

(54) IMAGE MANAGEMENT SERVER, IMAGE DISPLAY APPARATUS, IMAGE PROVISION METHOD, IMAGE ACQUISITION METHOD, PROGRAM, AND IMAGE MANAGEMENT SYSTEM

(75) Inventors: Masato Kajimoto, Chiba (JP); Naoki Tagami, Tokyo (JP); Kenji Yamane, Kanagawa (JP); Hiroshi Kyusojin, Tokyo (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 13/164,415

(22) Filed: Jun. 20, 2011

(65) Prior Publication Data

US 2011/0317891 A1    Dec. 29, 2011

(30) Foreign Application Priority Data

Jun. 29, 2010    (JP) ................. 2010-147635

(51) Int. Cl.
*G06K 9/00* (2006.01)
*G06K 9/54* (2006.01)

(52) U.S. Cl.
USPC .......................... 382/128; 382/305

(58) Field of Classification Search
USPC ............... 382/128–134, 305, 312; 348/79; 359/372
See application file for complete search history.

(56) References Cited

U.S. PATENT DOCUMENTS

| | | | |
|---|---|---|---|
| 6,031,930 A | 2/2000 | Bacus et al. | |
| 6,101,265 A | 8/2000 | Bacus et al. | |
| 6,226,392 B1 | 5/2001 | Bacus et al. | |
| 6,272,235 B1 | 8/2001 | Bacus et al. | |
| 6,396,941 B1 | 5/2002 | Bacus et al. | |
| 6,404,906 B2 | 6/2002 | Bacus et al. | |
| 6,522,774 B1 | 2/2003 | Bacus et al. | |
| 6,674,881 B2 | 1/2004 | Bacus et al. | |
| 6,674,884 B2 | 1/2004 | Bacus et al. | |
| 6,775,402 B2 | 8/2004 | Bacus et al. | |
| 7,110,586 B2 | 9/2006 | Bacus et al. | |
| 7,146,372 B2 | 12/2006 | Bacus et al. | |
| 7,149,332 B2 | 12/2006 | Bacus et al. | |
| 7,542,596 B2 | 6/2009 | Bacus et al. | |
| 7,738,688 B2 | 6/2010 | Eichhorn et al. | |
| 7,856,131 B2 | 12/2010 | Bacus et al. | |
| 7,916,916 B2 * | 3/2011 | Zeineh | 382/128 |
| 7,949,474 B2 * | 5/2011 | Callahan et al. | 702/19 |
| 8,094,902 B2 * | 1/2012 | Crandall et al. | 382/128 |
| 2005/0254696 A1 | 11/2005 | Bacus et al. | |

FOREIGN PATENT DOCUMENTS

JP    2006-519443    8/2006

* cited by examiner

*Primary Examiner* — Kanjibhai Patel
(74) *Attorney, Agent, or Firm* — K&L Gates LLP

(57) ABSTRACT

An image management server is provided including a microscopic image acquisition portion acquiring a microscopic image of a sample made of a plurality of tile images picked up by a microscope before placing the acquired microscopic image into a predetermined storage area. The image management server also includes a meta information creation portion creating meta information determining the microscopic image according to a result of data analysis acquired by the microscopic image acquisition portion; an image provision processing portion providing the meta information and the microscopic image to an image display apparatus in response to a request from the image display apparatus capable of viewing microscopic images. The image management server also includes a provided image prediction portion predicting the tile image highly likely to be requested by the image display apparatus based on hint information which is transmitted from the image display apparatus and which represents content of a microscopic image display process performed by the image display apparatus.

20 Claims, 28 Drawing Sheets

FIG.14

```xml
<?xml version="1.0" encoding="UTF-8" ?>
<gimage id="S101010_20090302_111315"
        width="40000"
        height="30000"
        tileSize="256"
        magBase="20"
        umPerPix="0.232"
        zStackNum="99"
        rotate="90"
        version="0.4">
  <slideInfo>
    <stain>IHC</stain>
    <antiBody>CD68</antiBody>
  </slideInfo>
  <scannerInfo>
    <date> 2009-03-02T15:35:00+0900</date>
    <startTime> 2009-03-02T15:00:00+0900</startTime>
    <name>Pathology Microscope</name>
    <version>1.0</version>
  </scannerInfo>
  <converterInfo>
    <name>Converter 1</name>
    <conversionDate > 2009-03-02T15:36:00+0900 </conversionDate>
    <version>1.0</version>
  </converterInfo >
  <processInfo>
    <name>Transcoder</name>
    <processDate>2010-04-01T11:11:11+0900<processDate>
    <version>1.0</version>
  </processInfo>
  <description> xxxx </description>
  <zStack index="0" file="20090302_0.sgv" type="sgv" tileOrder="reverse"/>
  <zStack index="1" file="20090302_1.sgv" type="sgv" tileOrder="reverse"/>
  <zStack index="2" file="20090302_2.sgv" type="sgv"/>
  <mipInfo id="0" baseTileID="0" colnum="1" rownum="1"/>
  <mipInfo id="1" baseTileID="1" colnum="2" rownum="2"/>
  <mipInfo id="2" baseTileID="5" colnum="4" rownum="3"/>

<cartridgeInfo>
    <cartridgeId>0</cartridgeId>
    <slideId>10</slideId>
    <consecutiveId>10</consecutiveId>
  </cartridgeInfo>

<slideMacroImage file="20090302_MacroImage.jpg" width="512" height="512" />
    <slideLabelImage file="20090302_LabelImage.jpg" width="512" height="256" />
    <slideLabelImage file="20090302_SecureLabelImage.jpg" width="512" height="256" secure="yes"/>
</gimage>
```

FIG. 15A gimage ELEMENTS

| | ATTRIBUTE NAME | EXPLANATION |
|---|---|---|
| REQUIRED | id | ID SPECIFIC TO THE SLIDE |
| REQUIRED | width | INTEGER REPRESENTING THE WIDTH (PIXEL COUNT) OF THE IMAGE |
| REQUIRED | height | INTEGER REPRESENTING THE HEIGHT (PIXEL COUNT) OF THE IMAGE |
| REQUIRED | tileSize | INTEGER REPRESENTING THE TILE SIZE (PIXEL COUNT) |
| OPTIONAL | magBase | INTEGER (OPTIONAL) REPRESENTING THE MAGNIFICATION FOR PIXEL-BY-PIXEL DISPLAY |
| OPTIONAL | umPerPixel | DECIMAL NUMBER REPRESENTING THE PIXEL SIZE ($\mu m$) FOR PIXEL-BY-PIXEL DISPLAY |
| REQUIRED | zStackNum | Z STACK COUNT (1 FOR NO Z STACK; THE NUMBER OF Z STACKS WHERE THEY EXIST) |
| OPTIONAL | umPerPlane | DECIMAL NUMBER ($\mu m$) REPRESENTING THE PLANE-TO-PLANE DISTANCE WHERE Z STACKS EXIST |
| REQUIRED | version | CHARACTER STRING OF THE FILE FORMAT VERSION |
| OPTIONAL | rotate | SLIDE ROTATION ANGLE; WHEN DISPLAYED, THE SLIDE IS ROTATED CLOCKWISE BY THE ANGLE DESIGNATED BY THE ELEMENT "rotate" |

FIG. 15B gimage ELEMENTS

| | SLAVE ELEMENT NAME | EXPLANATION |
|---|---|---|
| OPTIONAL | scannerInfo | INFORMATION ABOUT IMAGE PICKUP CONDITIONS |
| OPTIONAL | converterInfo | INFORMATION ABOUT CONVERSION BY CONVERTER FROM ANOTHER FORMAT |
| OPTIONAL | processInfo | INFORMATION ABOUT POST-PROCESSING CONVERSION PERFORMED ON IMAGE |
| OPTIONAL | description | DESCRIPTION ADDED BY USER (AT IMAGE PICKUP TIME) |
| OPTIONAL | slideMacroImage | INFORMATION ABOUT SLIDE MACRO IMAGE |
| OPTIONAL | slideLabwlImage | INFORMATION ABOUT SLIDE LABEL IMAGE |
| REQUIRED | zStack | INFORMATION ABOUT IMAGES OF ONE zStack |

FIG. 15C slideInfo ELEMENTS

| | SLAVE ELEMENT NAME | EXPLANATION |
|---|---|---|
| OPTIONAL | stain | STAIN INFORMATION CHARACTER STRING |
| OPTIONAL | antiBody | ANTIBODY INFORMATION CHARACTER STRING |

FIG. 15D scannerInfo ELEMENTS

| | SLAVE ELEMENT NAME | EXPLANATION |
|---|---|---|
| OPTIONAL | version | INPUT SOFTWARE VERSION |
| OPTIONAL | name | INPUT SCANNER NAME |
| OPTIONAL | date | IMAGE PICKUP DATE CHARACTER STRING (IN ISO 8601 FORMAT) |
| OPTIONAL | description | INPUT IMAGING CIRCUMSTANCES (LIGHTING CONDITIONS, LENS NAME, ETC.) TO TEXT THE FORMAT IS NOT SPECIFIED |

FIG.15E converterInfo ELEMENTS

|  | SLAVE ELEMENT NAME | EXPLANATION |
|---|---|---|
| REQUIRED | name | INPUT CONVERTER NAME |
| OPTIONAL | version | INPUT SOFTWARE VERSION |
| OPTIONAL | conversionDate | CONVERSION DATE CHARACTER STRING (IN ISO 8601 FORMAT) |
| OPTIONAL | description | INPUT CONVERSION INFORMATION (ORIGINAL INFORMATION) TO TEXT<br>THE TEXT FORMAT IS NOT SPECIFIED |

FIG.15F processInfo ELEMENTS

|  | SLAVE ELEMENT NAME | EXPLANATION |
|---|---|---|
| REQUIRED | name | INPUT NAME OF THE POST-PROCESSING SOFTWARE |
| OPTIONAL | version | INPUT SOFTWARE VERSION |
| OPTIONAL | processDate | POST-PROCESSING DATE CHARACTER STRING (IN ISO 8601 FORMAT) |
| OPTIONAL | description | INPUT POST-PROCESSING INFORMATION TO TEXT<br>THE TEXT FORMAT IS NOT SPECIFIED |

FIG.15G slideMacroImage ELEMENTS

|  | ATTRIBUTE NAME | EXPLANATION |
|---|---|---|
| REQUIRED | file | IMAGE DATA FILE NAME CHARACTER STRING |
| REQUIRED | width | IMAGE WIDTH (PIXEL COUNT) |
| REQUIRED | height | IMAGE HEIGHT (PIXEL COUNT) |

FIG.15H slideLabelImage ELEMENTS

|  | ATTRIBUTE NAME | EXPLANATION |
|---|---|---|
| REQUIRED | file | IMAGE DATA FILE NAME CHARACTER STRING |
| REQUIRED | width | IMAGE WIDTH (PIXEL COUNT) |
| REQUIRED | height | IMAGE HEIGHT (PIXEL COUNT) |
| OPTIONAL | secure | THIS ATTRIBUTE REPRESENTS WHETHER OR NOT SECURE INFORMATION EXISTS<br>"yes": SECURE INFORMATION EXISTS<br>"no": SECURE INFORMATION DOES NOT EXIST (default) |

FIG.15I cartridgeInfo ELEMENTS

|  | ITEM NAME | EXPLANATION |
|---|---|---|
| OPTIONAL | cartridgeId | CARTRIDGE NUMBER (INTEGER OF 0 OR LARGER) |
| OPTIONAL | slideId | INTRA-CARTRIDGE SLIDE NUMBER (INTEGER OF 0 OR LARGER) |
| OPTIONAL | consecutiveId | SLIDE SERIAL NUMBER AT CONSECUTIVE IMAGE PICKUP TIME (INTEGER OF 0 OR LARGER) |

WHERE THERE IS HINT INFORMATION

IMAGE MANAGEMENT SERVER, IMAGE DISPLAY APPARATUS, IMAGE PROVISION METHOD, IMAGE ACQUISITION METHOD, PROGRAM, AND IMAGE MANAGEMENT SYSTEM

CROSS REFERENCE TO RELATED APPLICATIONS

The present disclosure claims priority to that disclosed in Japanese Priority Patent Application JP 2010-147635 filed in the Japan Patent Office on Jun. 29, 2010, the entire content of which is hereby incorporated by reference.

BACKGROUND

The present disclosure relates to an image management server, an image display apparatus, an image provision method, an image acquisition method, a program, and an image management system.

In recent years, research has been in progress on the techniques for digitizing images of microscopically observed samples so as to display the digitized sample images on a suitable display device for observation.

Where digitized sample images are stored for the moment in a server on a network so that the stored images may later be viewed through retrieval from the server, it is possible to promote the development of so-called telepathology, a practice whereby a medical doctor at a remote location can render pathological diagnoses by viewing the sample images via the network.

A system may thus be structured by connecting on the network the server that holds digitized sample images with client devices each used to view the images from the server. For such a system, enhanced response performance is important for increasing the convenience of the user.

JP-T-2006-519443 (called Patent Document 1 hereunder) discloses a technique that attempts to boost response performance by caching image data and authentication information.

SUMMARY

During transmission and reception of image data between the server and its client devices over the network outlined above, a decline in responsiveness due to network response delays (round trip time (RTT)) can become a problem. The technique described in the above-cited Patent Document 1, however, does not take into account the network response delays with regard to the cached image data being accessed.

The present disclosure has been made in view of the above circumstances and provides an image management server, an image display apparatus, an image provision method, an image acquisition method, a program, and an image management system for minimizing any decline in response performance attributable to the round trip time in order to improve the convenience of the user.

According to one embodiment, there is provided an image management server including: a microscopic image acquisition portion configured to acquire a microscopic image of a sample made of a plurality of tile images picked up by a microscope before placing the acquired microscopic image into a predetermined storage area; a meta information creation portion configured to create meta information determining the microscopic image in accordance with a result of data analysis performed on the microscopic image acquired by the microscopic image acquisition portion; an image provision processing portion configured to provide the meta information and the microscopic image to an image display apparatus in response to a request from the image display apparatus capable of viewing microscopic images; and a provided image prediction portion configured to predict the tile image highly likely to be requested by the image display apparatus based on hint information which is transmitted from the image display apparatus and which represents content of a microscopic image display process performed by the image display apparatus.

In an embodiment, if the hint information includes information about the tile image displayed on a display screen of the image display apparatus, then the provided image prediction portion may predict a tile image positioned near the tile image displayed on the display screen, as the tile image highly likely to be requested by the image display apparatus.

In an embodiment, if the hint information includes information about a motion vector representing the direction of a user operation on the image display apparatus, then the provided image prediction portion may predict a tile image positioned in the direction of the motion vector as the tile image highly likely to be requested by the image display apparatus.

In an embodiment, the disclosed image management server may further include a cache configured to store at least either the tile image predicted by the provided image prediction portion or the tile image provided to the image display apparatus.

In an embodiment, if there exist a plurality of tile images to be provided to the image display apparatus, then the image provision processing portion may prioritize the plurality of tile images to be provided and provide the tile images sequentially in order of priority to the image display apparatus.

In an embodiment, the image provision processing portion may classify the tile images requested by the image display apparatus into the tile images held in the cache and the tile images not held therein so that the tile images stored in the cache may be provided preferentially.

In an embodiment, if the microscopic image is made up of the tile images in a plane direction and of the tile images in a focus direction and if one of the tile images in the plane direction is requested, then the image provision processing portion may provide the requested tile image as well as a tile image which is in the same position as the requested tile image in the plane direction and which is in a different position therefrom in the focus direction.

In an embodiment, if a plurality of tile images are demanded by the image display apparatus in a single request, then the image provision processing portion may provide the plurality of tile images collectively to the image display apparatus.

According to another embodiment, there is provided an image display apparatus including: a microscopic image acquisition control portion configured to control the acquisition of a microscopic image of a sample made of a plurality of tile images and picked up by a microscope, from an image management server managing microscopic images; a display control portion configured to control the display, on a display screen, of the microscopic image acquired by the microscopic image acquisition control portion; a hint information creation portion configured to create hint information representing content of a display process for displaying the microscopic image on the display screen, based on at least one of information output from the display control portion and displayed on the display screen regarding the microscopic image and on user operation information about an operation performed by a user; and a hint information transmission portion configured to transmit the hint information created by the hint information creation portion to the image management server.

In an embodiment, based on the user operation information, the hint information creation portion may identify a motion vector representing the direction of the user operation on the image display apparatus and acquire information about the motion vector as the hint information.

In an embodiment, the hint information transmission portion may transmit the hint information as well as information requesting the provision of the tile images to the image management server.

In an embodiment, the hint information transmission portion may transmit the hint information to the image management server independently of the information requesting the provision of the tile images.

In an embodiment, the microscopic image acquisition control portion may acquire from the image management server meta information determining the microscopic image and, based on the acquired meta information, identify the tile image desired to be acquired.

In an embodiment, the microscopic image acquisition control portion may identify the tile image desired to be acquired, using either an identification number which is specific to each of the tile images and which denotes the desired tile image, or the coordinates of the desired tile image within the microscopic image and a magnification ratio of the microscopic image.

In an embodiment, the microscopic image acquisition control portion may request a plurality of tile images desired to be acquired in a single request.

According to a further embodiment, there is provided an image provision method including: acquiring a microscopic image of a sample made of a plurality of tile images picked up by a microscope before placing the acquired microscopic image into a predetermined storage area; creating meta information determining the microscopic image in accordance with a result of data analysis performed on the acquired microscopic image; providing the meta information and the microscopic image to an image display apparatus in response to a request from the image display apparatus capable of viewing microscopic images; and predicting the tile image highly likely to be requested by the image display apparatus based on hint information which is transmitted from the image display apparatus and which represents content of a microscopic image display process performed by the image display apparatus.

According to another embodiment, there is provided an image acquisition method including: acquiring a microscopic image of a sample made of a plurality of tile images and picked up by a microscope, from an image management server managing microscopic images; displaying, on a display screen, the acquired microscopic image; creating hint information representing content of a display process for displaying the microscopic image on the display screen, based on at least one of information displayed on the display screen regarding the microscopic image and on user operation information about an operation performed by a user; and transmitting the created hint information to the image management server.

According to another embodiment, there is provided a program for causing a computer to implement functionality including: a microscopic image acquisition function acquiring a microscopic image of a sample made of a plurality of tile images picked up by a microscope before placing the acquired microscopic image into a predetermined storage area; a meta information creation function creating meta information determining the microscopic image in accordance with a result of data analysis performed on the microscopic image acquired by the microscopic image acquisition function; an image provision processing function providing the meta information and the microscopic image to an image display apparatus in response to a request from the image display apparatus capable of viewing microscopic images; and a provided image prediction function predicting the tile image highly likely to be requested by the image display apparatus based on hint information which is transmitted from the image display apparatus and which represents content of a microscopic image display process performed by the image display apparatus.

According to another embodiment, there is provided a program for causing a computer to implement functionality including: a microscopic image acquisition control function controlling the acquisition of a microscopic image of a sample made of a plurality of tile images and picked up by a microscope, from an image management server managing microscopic images; a display control function controlling the display, on a display screen, of the microscopic image acquired by the microscopic image acquisition control function; a hint information creation function creating hint information representing content of a display process for displaying the microscopic image on the display screen, based on at least one of information displayed on the display screen regarding the microscopic image and user operation information about an operation performed by a user; and a hint information transmission function transmitting the hint information created by the hint information creation function to the image management server.

According to another embodiment, there is provided an image management system including the image management server and image display apparatus outlined above.

According to the above-outlined present disclosure, it is possible to minimize any decline in response performance attributable to network response delays in order to improve the convenience of the user.

BRIEF DESCRIPTION OF THE FIGURES

Further objects and advantages of the present disclosure will become apparent upon a reading of the following description and appended drawings in which:

FIG. 14 is a tabular view explanatory of header information in microscopic image data;

FIG. 15A is a tabular view explanatory of the header information in the microscopic image data;

FIG. 15B is a tabular view explanatory of the header information in the microscopic image data;

FIG. 15C is a tabular view explanatory of the header information in the microscopic image data;

FIG. 15D is a tabular view explanatory of the header information in the microscopic image data;

FIG. 15E is a tabular view explanatory of the header information in the microscopic image data;

FIG. 15F is a tabular view explanatory of the header information in the microscopic image data;

FIG. 15G is a tabular view explanatory of the header information in the microscopic image data;

FIG. 15H is a tabular view explanatory of the header information in the microscopic image data;

FIG. 15I is a tabular view explanatory of the header information in the microscopic image data;

DETAILED DESCRIPTION

Figure 1:
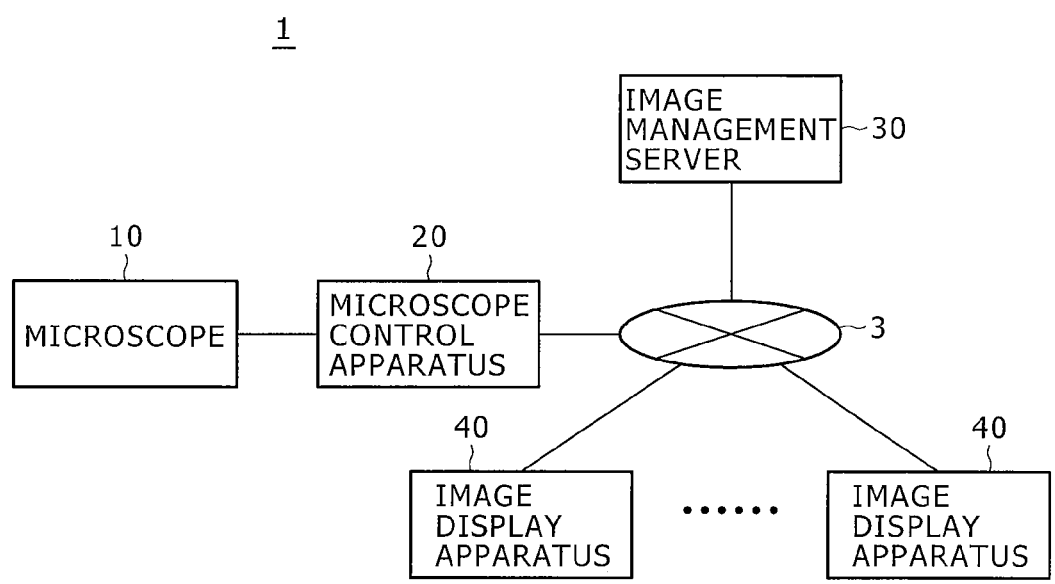
FIG. 1 is a schematic view explanatory of a microscopic image management system as a embodiment.

The embodiments of the present invention will now be described in detail with reference to the accompanying drawings. In the ensuing description and throughout the attached drawings, like reference numerals designate like or corresponding components that are substantially the same in functional structure, and their explanations will be omitted where redundant.

The description will be given under the following headings:

(1) Embodiment
(1-1) Structure of the microscopic image management system
(1-2) Overall structure of the microscope
(1-3) Structure of the microscope control apparatus
(1-4) Underlying technology and its problems
(1-5) Structure of the image management server
(1-6) Structure of the image display apparatus
(1-7) Examples of meta information
(1-8) Examples of information exchanged between the image display apparatus and the image management server
(1-9) Tile image caching method
(1-10) Flow of the image viewing method
(2) Hardware structure of the image management server and image display apparatus as part of the embodiment
(3) Conclusion In the description that follows, the samples imaged by the microscope pertain to, but are not limited by, biological samples made up of tissue sections or smears of connective tissues (e.g., blood) and/or epithelial tissues.

(1) EMBODIMENT (1-1) Structure of the Microscopic Image Management System

Described first below in reference to FIG. 1 is a typical structure of a microscopic image management system 1 implemented as an embodiment. FIG. 1 is a schematic view explanatory of the microscopic image management system 1 as the embodiment.

As shown in FIG. 1, the microscopic image management system 1 as the embodiment is made up of a microscope 10, a microscope control apparatus 20, an image management server 30, and an image display apparatus 40. The microscope control apparatus 20, image management server 30, and image display apparatus 40 are interconnected via a network 3.

The network 3 is a communication network that connects in bidirectionally communicable fashion the microscope control apparatus 20, image management server 30, and image display apparatus 40 making up the embodiment. For example, the network 3 may be wired or wireless, and may be any one of public line networks such as the Internet, telephone networks, satellite communication networks and broadcast networks; or of private line networks such as WAN (wide area network), LAN (local area network), IP-VPN (Internet Protocol-Virtual Private Network), Ethernet (registered trademark), and wireless LAN. As another alternative, the network 3 may be a communication network dedicated to the microscopic image management system 1 of the embodiment.

The microscope 10 illuminates in a suitable manner the sample (i.e., biological sample) placed on its stage, and picks up the light passing through or emanating from the sample for image formation. An overall structure of the microscope 10 as part of the embodiment will be explained later in detail.

The microscope 10 is under drive control by the microscope control apparatus 20. A sample image picked up by the microscope 10 is stored into the image management server 30 via the microscope control apparatus 20.

The microscope control apparatus 20 performs drive control on the microscope 10 that picks up images of samples. The microscope control apparatus 20 picks up a digital image of a sample by controlling the microscope 10, and carries out predetermined digital processes on the acquired digital image data of the sample. Also, the microscope control apparatus 20 uploads the obtained digital image data of the sample to the image management server 30.

The image management server 30 is an apparatus that stores and manages digital image data of samples picked up by the microscope 10. Given the digital image data of a sample output from the microscope control apparatus 20, the image management server 30 places the acquired digital image data of the sample into a suitable storage area for subsequent access by a user. Upon receipt of a request to view the digital image data of a given sample froth the image display apparatus 40 (i.e., a viewer or its equivalent) operated by the user, the image management server 30 provides the digital image data of the sample in question to the image display apparatus 40.

The image display apparatus 40 is a terminal (equivalent to the viewer) to be operated by the user who wants to view digital image data of samples. The user wishing to view digital image data may reference a list or the like of the digital image data stored in the image management server 30, identify the digital image data desired to be viewed, and request the image management server 30 to provide the identified digital image data. When provided with the digital image data in question from the image management server 30, the image display apparatus 40 displays on its display device or the like an image representing the provided digital image data so that the requesting user may view the image.

The structures of the image management server 30 and image display apparatus 40 making up the embodiment will be explained later in detail.

Although the system 1 shown in FIG. 1 has one microscope 10, one microscope control apparatus 20, and one image management server 30, this configuration is not limitative of the present disclosure. Alternatively, there may be multiple microscopes 10, multiple microscope control apparatuses 20, and multiple image management servers 30 constituting the system 1.

(1-2) Overall Structure of the Microscope

Figure 2:
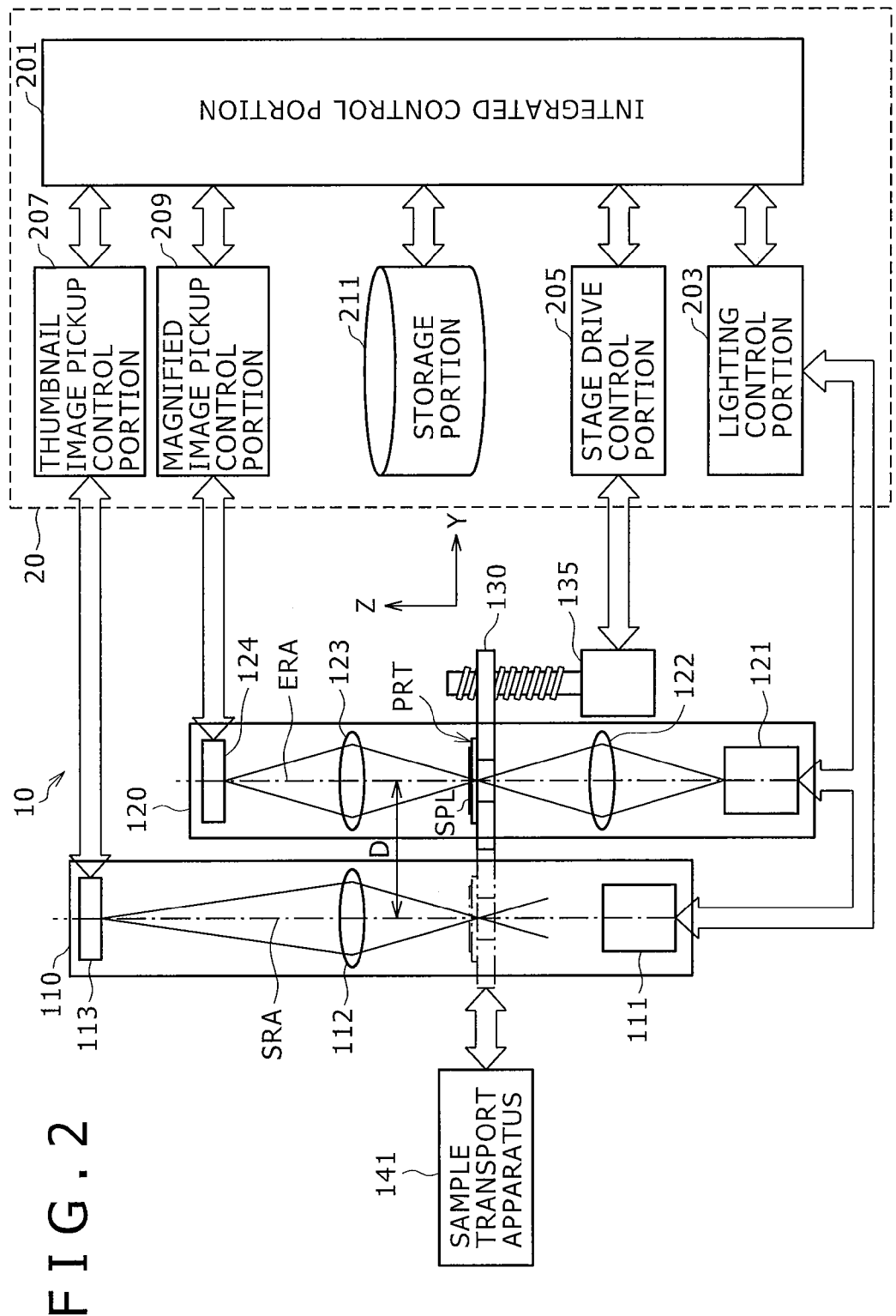
FIG. 2 is a schematic view explanatory of structures of a microscope and a microscope control apparatus as part of the embodiment.

Explained below in reference to FIG. 2 is an overall structure of the microscope 10 as part of the embodiment. FIG. 2 is a schematic view explanatory of overall structures of the microscope 10 and microscope control apparatus 20 as part of the embodiment.

Overall Structures

As shown illustratively in FIG. 2, the microscope 10 of the embodiment has a thumbnail image pickup portion 110 and a magnified image pickup portion 120. The thumbnail image pickup portion 110 picks up an overall image (called the thumbnail image hereunder) of a preparation PRT carrying a biological sample SPL. The magnified image pickup portion 120 picks up an image of the biological sample SPL magnified by a predetermined factor (called the magnified image hereunder).

The preparation PRT is formed by a slide glass that fixes suitably the biological sample SPL made up of a tissue section or a smear of a connective tissue (e.g., blood) and/or an epithelial tissue. The tissue section or smear may be suitably stained as needed. The stains may include not only general stains such as HE (hematoxylin-eosin) stain, Giemsa stain, and Papanicolaou stain, but also fluorescence stains including FISH (fluorescence in-situ hybridization) and enzyme antibody technique.

A label depicting supplementary information identifying the biological sample SPL in question (e.g., name of the person who prepared the sample, date of sample preparation, and type of stain) may be affixed to the preparation PRT.

The microscope 10 of the embodiment is equipped with a stage 130 on which the above-described preparation PRT is mounted, and a stage drive mechanism 135 for moving the stage 130 in diverse directions. The stage drive mechanism 135 may be used freely to move the stage 130 in the direction paralleling the stage surface (X-Y axis direction) and in the direction perpendicular to the stage surface (Z-axis direction).

The microscope 10 of the embodiment may be equipped with a sample transport apparatus 141 that transports the preparation PRT including the sample SPL onto the stage 130. The sample transport apparatus 141, when installed, makes it possible automatically to put the sample to be imaged into place, whereby the samples SPL may be changed in automated fashion.

Thumbnail Image Pickup Portion

The thumbnail image pickup portion 110 is mainly composed of a light source 111, an objective lens 112, and an imaging element 113, as shown in FIG. 2.

The light source 111 is installed on the opposite side of the stage 130 from its preparation-mounting surface. The light source 111 may have two types of lighting switched alternately for selective illumination: lighting for illuminating a biological sample SPL having undergone general staining (this type of lighting may be called bright field illumination hereunder), or lighting for illuminating a biological sample SPL subjected to special staining (this type of lighting may be called dark field illumination hereunder). Alternatively, the light source 111 may be solely capable of illuminating either bright field illumination or dark field illumination. In the alternative case, two kinds of light sources 111 may have to be provided: a light source for bright field illumination and a light source for dark field illumination.

Furthermore, the thumbnail image pickup portion 110 may be separately provided with a label light source (not shown) for illuminating the supplementary information written on the label attached to the preparation PRT.

The objective lens 112 having a predetermined magnification ratio is installed on the side of the preparation-mounting surface of the stage 130. A source axis SRA of the objective lens 112 is set normal to a reference position of the thumbnail image pickup portion 110 on the preparation-mounting surface. The light passing through the preparation PRT on the stage 130 is focused by the objective lens 112 in a manner of forming an image on the imaging element 113 disposed downstream of the objective lens 112 (i.e., in the direction of light progression).

The imaging element 113 produces an image out of the light coming from an imaging range covering the preparation PRT as a whole (i.e., the transmitted light from the entire preparation PRT) placed on the preparation-mounting surface of the stage 130. The image formed on the imaging element 113 is a thumbnail image that constitutes the image mage covering the whole preparation PRT.

Magnified Image Pickup Portion

The magnified image pickup portion 120 is mainly composed of a light source 121, a condenser lens 122, an objective lens 123, and an imaging element 124, as shown in FIG. 2.

The light source 121 designed for bright field illumination is installed on the opposite side of the stage 130 from its preparation-mounting surface. In a different position from the light source 121 (e.g., on the side of the preparation-mounting surface), another light source (not shown) designed for dark field illumination is installed.

The condenser lens 122 condenses bright field illumination light from the light source 121 or dark field illumination light from the dark field light source and guides the condensed light onto the preparation PRT on the stage 130. The condenser lens 122 is located between the light source 121 and the stage 130, with a source axis ERA of the lens 122 set to be normal to the reference position of the magnified image pickup portion 120 on the preparation-mounting surface.

The objective lens 123 having a predetermined magnification ratio is installed on the side of the preparation-mounting surface of the stage 130. The source axis ERA of the objective lens 123 is set normal to the reference position of the magnified image pickup portion 120 on the preparation-mounting surface. By having the objective lens 123 changed as needed, the magnified image pickup portion 120 can pick up images of diverse magnifications of the biological sample SPL. The light passing through the preparation PRT on the stage 130 is focused by the objective lens 123 in a manner of forming an image on the imaging element 124 disposed downstream of the objective lens 123 (i.e., in the direction of light progression).

The imaging element 124 produces an image out of the light coming from the imaging range defined by a predetermined width and a predetermined length on the preparation PRT in accordance with the pixel size of the imaging element 124 and the magnification ratio of the objective lens 123. Since a part of the biological sample SPL is magnified by the objective lens 123, the above-mentioned imaging range is substantially narrower than the imaging range of the imaging element 113.

As shown in FIG. 2, the thumbnail image pickup portion 110 and magnified image pickup portion 120 are disposed apart by a distance D in the Y-axis direction between their source axes SRA and ERA that are normal to their respective reference positions. The distance D is set short in such a manner that a lens barrel (not shown) holding the objective lens 123 of the magnified image pickup portion 120 does not appear in the imaging range of the imaging element 113 and that the lens barrel is built small in size.

The imaging elements installed in the thumbnail image pickup portion 110 and magnified image pickup portion 120 may be either one-dimensional or two-dimensional imaging elements.

(1-3) Structure of the Microscope Control Apparatus

As shown in FIG. 2, the microscope 10 as part of the embodiment is connected with the microscope control apparatus 20 for controlling various components of the microscope 10. The microscope control apparatus 20 is mainly composed of an integrated control portion 201, a lighting control portion 203, a stage drive control portion 205, a thumbnail image pickup control portion 207, a magnified image pickup control portion 209, and a storage portion 211, as illustrated in FIG. 2.

The lighting control portion 203 including the light sources 111 and 121 is a processing portion that controls the light sources attached to the microscope 10. The stage drive control portion 205 is a processing portion that controls the stage drive mechanism 135. The thumbnail image pickup control portion 207 is a processing portion that controls the imaging element 113 for picking up thumbnail images. The magnified image pickup control portion 209 is a processing portion that controls the imaging element 124 for picking up magnified images of the biological sample SPL. These control portions are connected to the respectively controlled components via various communication channels.

The microscope control apparatus 20 of the embodiment is separately furnished with a control portion (i.e., integrated control portion 201) for controlling the microscope as a whole. This control portion 201 is connected to the above-mentioned diverse control portions via various data communication channels.

The control portions mentioned above may be implemented using a CPU (central processing unit), a ROM (read only memory), a RAM (random access memory), a storage device, a communication device, and arithmetic circuits, among others.

The storage portion 211 is a typical storage device attached to the microscope control apparatus 20 of the embodiment. The storage portion 211 stores various settings for controlling the microscope 10, diverse databases, and look-up tables such as a load prediction table. Also, the storage portion 211 may store diverse kinds of history information such as the history of sample imaging by the microscope 10. Furthermore, the storage portion 211 may accommodate, as needed, diverse parameters to be retained during some processing, results of processes in progress, various databases, or programs.

The processing portions possessed by the microscope control apparatus 20 may freely write and read data to and from the storage portion 211 above.

Below is a brief explanation of each of the control portions mentioned above.

Lighting Control Portion

The lighting control portion 203 is a processing portion that controls the light sources attached to the microscope 10 of the embodiment. Upon receipt of information output from the integrated control portion 201 specifying the method for lighting the biological sample SPL, the lighting control portion 203 controls illumination of the applicable light source based on the acquired information specifying the lighting method.

For example, consider the case where the lighting control portion 203 controls the light source 111 attached to the thumbnail image pickup portion 110. In this case, the light control portion 203 references the information specifying the lighting method in order to select one of two modes to be executed: a mode in which to acquire a bright field image (called bright field mode hereunder), or a mode in which to obtain a dark field image (called dark field mode hereunder). Thereafter, the lighting control portion 203 sets relevant parameters of the selected mode for the light source 111 in keeping with the selected mode. The light control portion 203 then causes the light source 111 to emit illumination light applicable to the mode in question. The illumination light coming from the light source 111 through an opening of the stage 130 illuminates the entire biological sample SPL. The parameters to be set by the lighting control portion 203 may include illumination light intensity levels and light source options, for example.

Consider also the case where the lighting control portion 203 controls the light source 121 attached to the magnified image pickup portion 120. In this case, the light control portion 203 references the information specifying the lighting method so as to select either bright field mode or dark field mode. Thereafter, the lighting control portion 203 sets relevant parameters of the selected mode for the light source 121 in accordance with the selected mode. The light control portion 203 then causes the light source 121 to emit illumination light applicable to the mode. The illumination light coming from the light source 121 through the opening of the stage 130 illuminates the whole biological sample SPL. The parameters to be set by the lighting control portion 203 may include illumination light intensity levels and light source options, for example.

In an embodiment, the illumination light for use in bright field mode may be visible light. Also, the illumination light used in dark field mode may preferably be a type of light that includes wavelengths capable of exciting fluorescent markers used for special staining. In dark field mode, the background of the fluorescent markers is cut out.

Stage Drive Control Portion

The stage drive control portion 205 is a processing portion that controls the stage drive mechanism 135 for driving the stage attached to the microscope 10 of the embodiment. Upon receipt of information output from the integrated control portion 201 specifying the method for imaging the biological sample SPL, the stage drive control portion 205 controls the stage drive mechanism 135 based on the acquired information about the imaging method.

For example, consider the case where the microscope 10 of the embodiment picks up a thumbnail image. Upon receipt of information output from the integrated control portion 201 saying that a thumbnail image of the entire sample SPL is to be picked up, the stage drive control portion 205 moves the stage 130 in the direction of the stage surface (X-Y axis direction) in such a manner that the preparation PRT as a whole comes into the imaging range of the imaging element 113. The stage drive control portion 205 further moves the stage 130 in the Z-axis direction so that the objective lens 112 is focused on the entire preparation PRT.

Consider now the case where the microscope 10 of the embodiment picks up a magnified image. Upon receipt of information output from the integrated control portion 201 saying that a magnified image of the entire sample SPL is to be picked up, the stage drive control portion 205 moves the stage 130 in the direction of the stage surface in such a manner that the biological sample SPL is shifted from between the light source 111 and the objective lens 112, to between the condenser lens 122 and the objective lens 123.

Also, the stage drive control portion 205 moves the stage 130 in the stage surface direction (X-Y axis direction) so that a specific part of the biological sample is positioned within the imaging range defined by the imaging element 124.

Furthermore, the stage drive control portion 205 performs drive control over the stage drive mechanism 135 to move the stage 130 in the direction normal to the stage surface (i.e., Z-axis direction, or the depth direction of the tissue section) in such a manner that that part of the biological sample SPL positioned within a predetermined imaging range coincides with the focus of the objective lens 123.

Thumbnail Image Pickup Control Portion

The thumbnail image pickup control portion 207 is a processing portion which is attached to the thumbnail image pickup portion 110 and which controls the imaging element 113. The thumbnail image pickup control portion 207 sets the parameters relevant to bright field mode or dark field mode for the imaging element 113. Upon acquiring an output signal coming from the imaging element 113 and corresponding to the image formed on the imaging plane of the imaging element 113, the thumbnail image pickup control portion 207 considers the acquired output signal to be the output signal representing a thumbnail image. After acquiring the output signal representative of the thumbnail image, the thumbnail image pickup control portion 207 outputs the data corresponding to the acquired signal (i.e., raw data) to the integrated control portion 201. The parameters to be set by the thumbnail image pickup control portion 207 may include exposure start and end timings, for example.

Magnified Image Pickup Control Portion

The magnified image pickup control portion 209 is a processing portion which is attached to the magnified image pickup portion 120 and which controls the imaging element 124. The magnified image pickup control portion 209 sets the parameters relevant to bright field mode or dark field mode for the imaging element 124. Upon acquiring an output signal coming from the imaging element 124 and corresponding to the image formed on the imaging plane of the imaging element 124, the magnified image pickup control portion 209 considers the acquired output signal to be the output signal representing a magnified image. After acquiring the output signal representative of the magnified image, the magnified image pickup control portion 209 outputs the data corresponding to the acquired signal (i.e., raw data) to the integrated control portion 201. The parameters to be set by the magnified image pickup control portion 209 may include exposure start and end timings, for example.

Integrated Control Portion

The integrated control portion 201 is a processing portion that controls the entire microscope including the above-described various control portions. The integrated control portion 201 acquires data about the thumbnail and magnified images picked up by the microscope 10 and allows the data to be developed or digitally processed in a suitable manner. Thereafter, the integrated control portion 201 uploads microscopic image data composed of the thumbnail and magnified images to the image management server 30 via the network 3. This allows the image display apparatus 40 connected to the network as a client device to view the microscopic images of samples picked up by the microscope 10.

Some examples of the functionality of the microscope control apparatus 20 as part of the embodiment were explained above. The components described above may be constituted using general-purpose members, materials or circuits, or specialized hardware dedicated to the functions of the components. Alternatively, the functions of the components may all be taken over by the CPU or the like. Thus it is possible to alter the configuration of the components as needed in keeping with the state of the art in effect when the embodiment is implemented.

It is also possible to create a computer program for implementing the functionality of the microscope control apparatus 20 as part of the embodiment and to install the created program in a personal computer or like equipment for execution. A recording medium which stores the computer program and from which the program can be read by computer may also be provided. The recording medium may come in diverse forms including magnetic disks, optical disks, magneto-optical disks, and flash memories. Furthermore, the above-mentioned computer program may be distributed over networks for example, without recourse to the recording medium.

(1-4) Underlying Technology and its Problems

Prior to an ensuing explanation of the detailed structures of the image management server 30 and image display apparatus 40, the underlying technology of the present disclosure will be briefly described below. The embodiment is structured in a manner of offering more pronounced benefits when improved over its underlying technology to be described hereunder. It is the technique for such improvement that characterizes the embodiment. That is, although the embodiment is built on the basic concepts of the technical matters to be described here, it should be noted that the essence of the embodiment is summarized in its improvements and that the embodiment is clearly different in structure and distinct in effectiveness from the underlying technology of the present disclosure.

Figure 3:
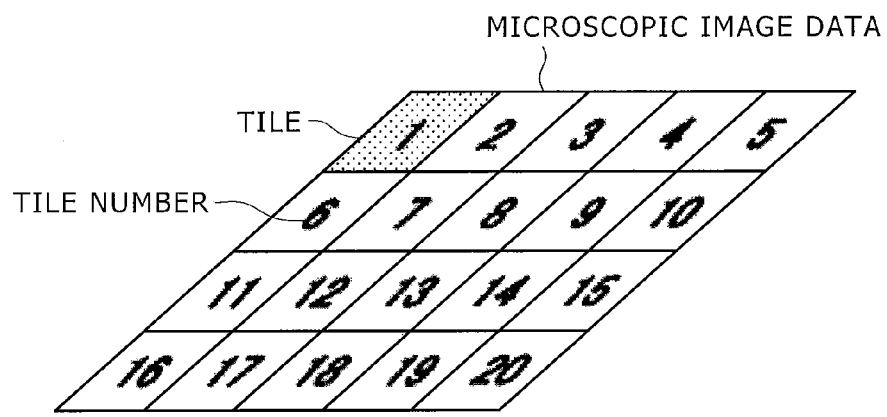
FIG. 3 is a schematic view explanatory of microscopic image data.

The microscope 10 of the embodiment shown in FIGS. 1 and 2, as with any microscope capable of picking up digital images, divides the digital image of a sample into a plurality of tile images as shown in FIG. 3 (in four rows and five columns in this example). Each of the tile images is then subjected to image compression processing such as JPEG before being stored onto a storage device such as a hard disk drive (HDD).

Although the width and height of all tile images are the same, the data size after compression may or may not be the same from one tile image to another depending on the resulting image. While it is possible to handle all tile images as different data files, if the image file of a single sample is divided into a plurality of independent files, that leads to growing management costs in system function and performance. In order to lessen such management costs, one file is usually made of a plurality of tile images covering one sample.

Figure 4:
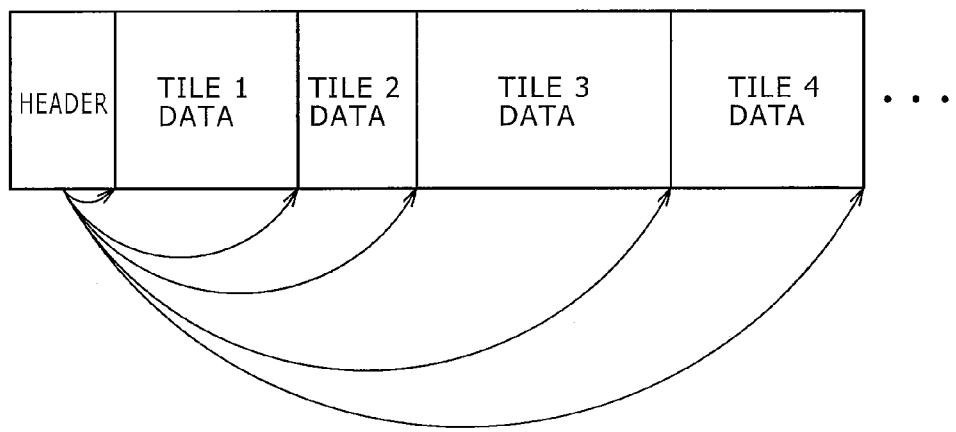
FIG. 4 is a schematic view explanatory of the microscopic image data.
Figure 5:
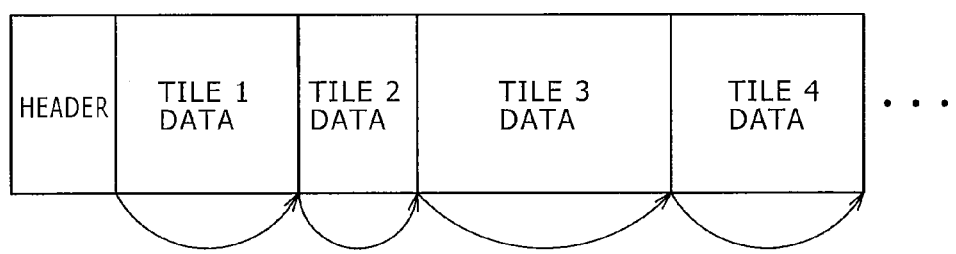
FIG. 5 is a schematic view explanatory of the microscopic image data.

In the case above, the start position of each tile image in a given data file is not known. In order to solve this problem, the start positions of all tile images may be included in the header part of the data file as shown in FIG. 4, or a data size may be prefixed to each tile image thereby permitting access to the next tile image as indicated in FIG. 5. The tile header of each tile image includes information such as imaging conditions including magnification and illumination light type in addition to the width and height of the tile image in question.

Figure 6:
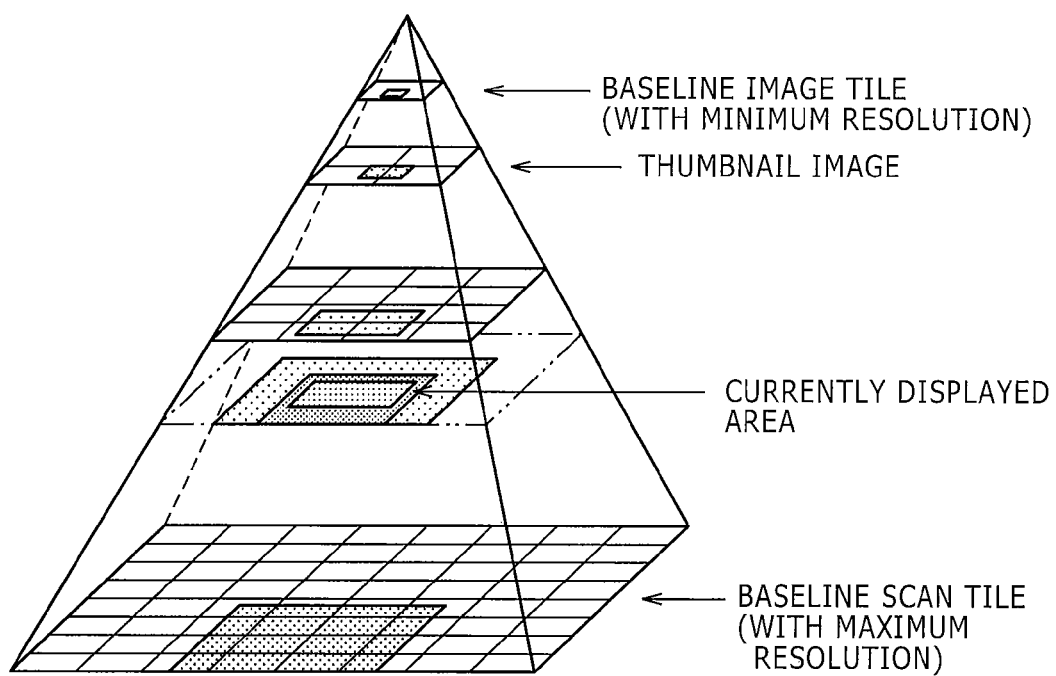
FIG. 6 is a schematic view explanatory of the microscopic image data.

The above-mentioned microscopic image data contained in a microscopic image data file includes tile images of diverse resolutions as shown in FIG. 6. As is clear from FIG. 6, the microscopic image data file is a so-called mipmap file in which baseline images (i.e., tile images) on various levels (layers) are vertically stacked in descending order of resolution to form a pyramidal structure.

As shown in FIG. 6, a baseline scan tile (tile image) of the maximum resolution is at the bottom of the pyramidal structure, with thumbnail images positioned in the upper part of the pyramid. When microscopic image data is made up of tile images of diverse resolutions, it is possible efficiently to perform a magnification or reduction process across resolution levels upon viewing of the microscopic image data in question.

Figure 7:
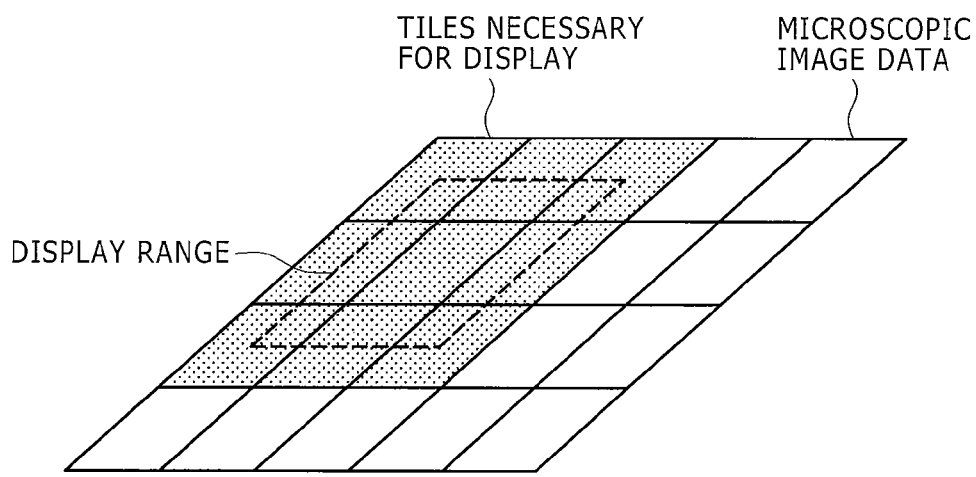
FIG. 7 is a schematic view explanatory of the microscopic image data.

When microscopic image data is to be viewed, a desired part of the applicable microscopic image having the structure illustrated in FIGS. 3 to 6 is displayed on the display screen. At this point, as shown in FIG. 7, the tile images covering at least part of the display range designated by the user's operations are used to display the designated display range on the display screen.

Figure 8:
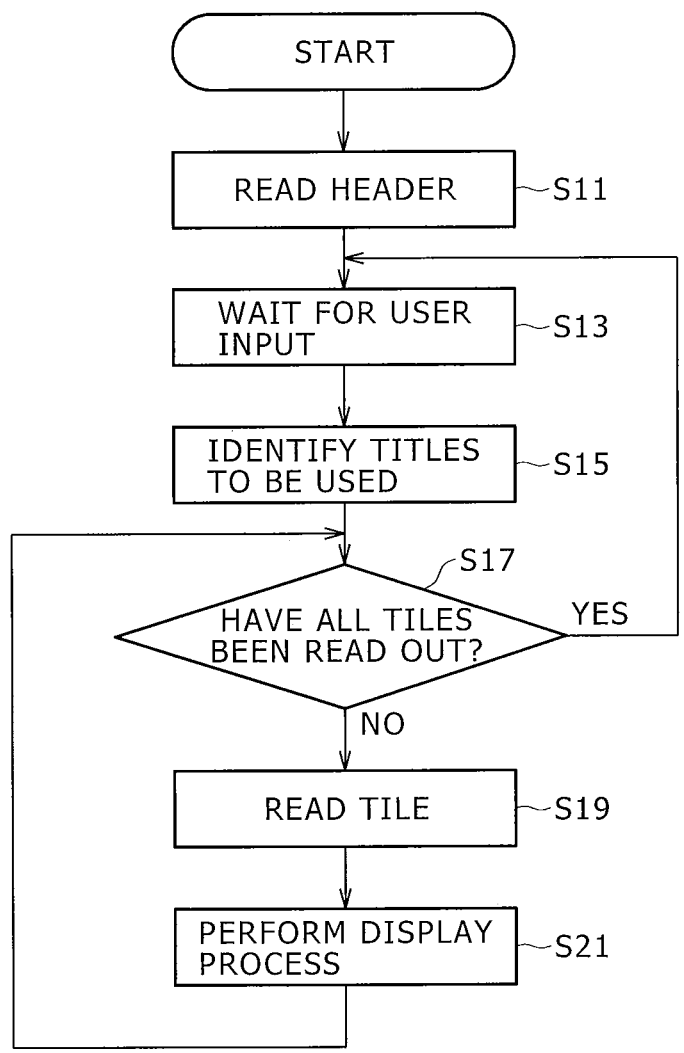
FIG. 8 is a flowchart explanatory of the underlying technology of the present disclosure.

Explained briefly below in reference to FIG. 8 is a flow of processing carried out when the management, provision, and viewing of microscopic image data are all brought about on the same apparatus (i.e., information processing apparatus).

The user first designates the sample desired to be viewed on the information processing apparatus. The information processing apparatus then reads the header of the applicable microscopic image data (in step S11) and waits for the user's input (in step S13).

Thereafter, when the user designates a desired part of the microscopic image to be viewed, the information processing apparatus identifies the tile images corresponding to the image part desired to be viewed by the user (in step S15). Based on information about the identified tile images, the information processing apparatus determines whether all tile images have been read out (in step S17).

If all tile images have yet to be read out, the information processing apparatus continues to read the applicable tile image from a predetermined storage area (in step S19) and displays the retrieved tile image (in step S21). Then returning to step S17, the information processing apparatus determines whether all tile images have been read out.

Meanwhile, if all tile images are found to have been read out in step S17, the information processing apparatus returns to step S13 and waits for the user's input.

Where a microscopic image is furnished with its tile numbers as shown in FIG. 3, consider the case in which a display range of the image such as one indicated in FIG. 7 is designated by the user's input in conjunction with the above-outlined flow of processing. In this case, the information processing apparatus determines that a total of nine tile images having tile numbers 1, 2, 3, 6, 7, 8, 11, 12 and 13 are needed in order to display the applicable display range. As a result, the information processing apparatus reads out all tile images by repeating the conditional branch in step S17 nine times so as to display the microscopic image corresponding to the display range of interest on the display screen.

Another case may be considered in which a server managing microscopic images provides the microscopic images it manages to client devices each designed to view the provided images. A flow of processing performed between such a server and its client device is explained briefly below in reference to FIGS. 9 and 10.

Figure 9:
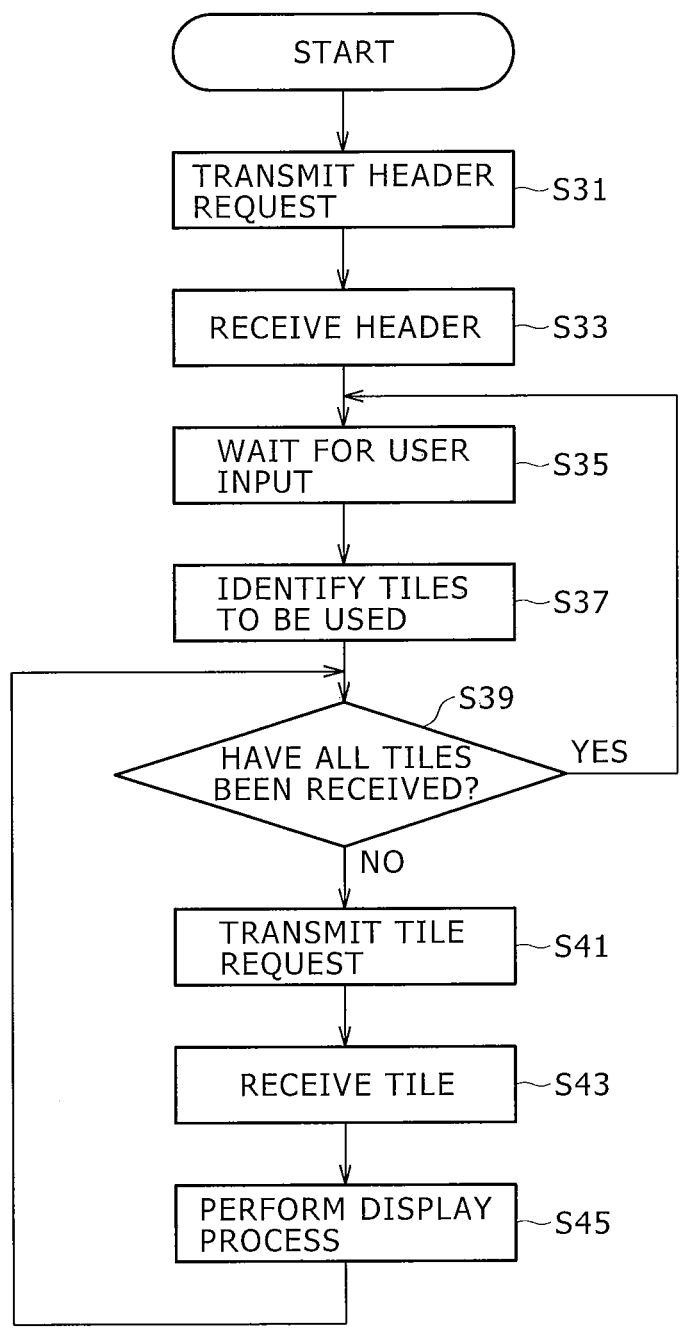
FIG. 9 is a flowchart explanatory of the underlying technology of the present disclosure.

The flow of processing on the side of the client device is explained briefly below in reference to FIG. 9.

The client device references a list or the like of the microscopic images acquired from the server, identifies the microscopic image of the sample desired to be viewed, and transmits a request for the header of the applicable microscopic image (in step S31). The client device then receives the header sent from the server (in step S33) and waits for the user's input (in step S35).

After that part of the microscopic image desired to be viewed is designated by the user's operations, the client device identifies the tile images corresponding to the image part desired to be viewed by the user (in step S37). Based on information about the identified tile images, the client device determines whether all tile images have been received (in step S39).

If all tile images have yet to be received, the client device transmits to the server a request for a tile image yet to be received (in step S41), and receives the tile image sent from the server (in step S43). The client device proceeds to display the received tile image (in step S45). Then returning to step S39, the client device determines whether all tile images have been received.

Meanwhile, if in step S39 all tile images are found to have been received, the client device returns to step S35 and waits for the user's input.

Figure 10:
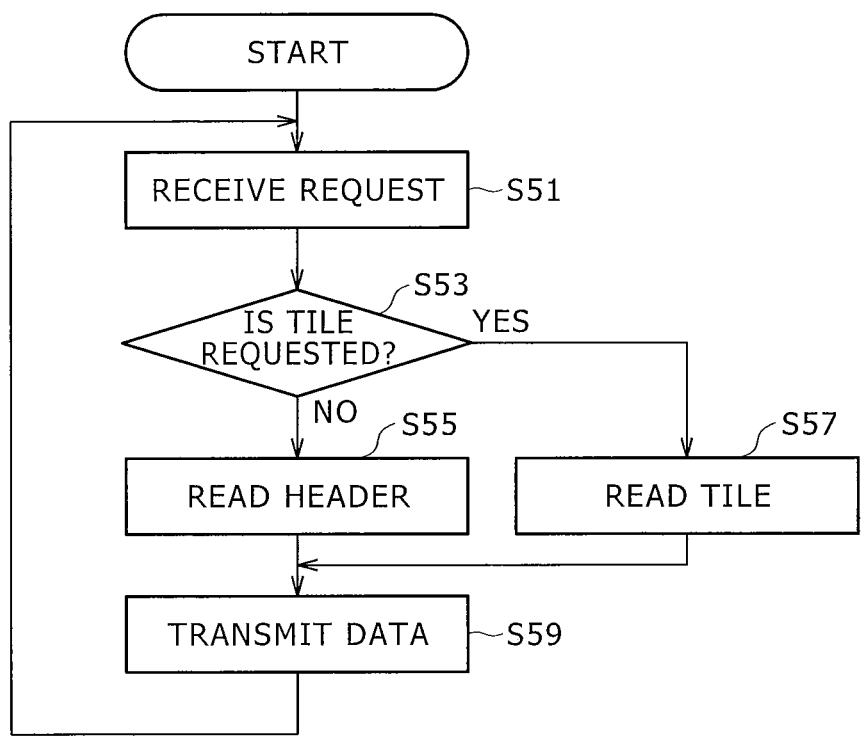
FIG. 10 is a flowchart explanatory of the underlying technology of the present disclosure.

The flow of processing on the side of the server is briefly explained below in reference to FIG. 10. The server managing microscopic image data receives a request sent from a client device (in step S51), and determines the content of the received request (in step S53).

If the request sent from the client device does not turn out to request any tile image, the server determines that the client device is requesting header information and reads the header from a predetermined storage area (in step S55). On the other hand, if the request received from the client device is found requesting a tile image, then the server reads the applicable tile image from a predetermined storage area (in step S57).

Figure 11:
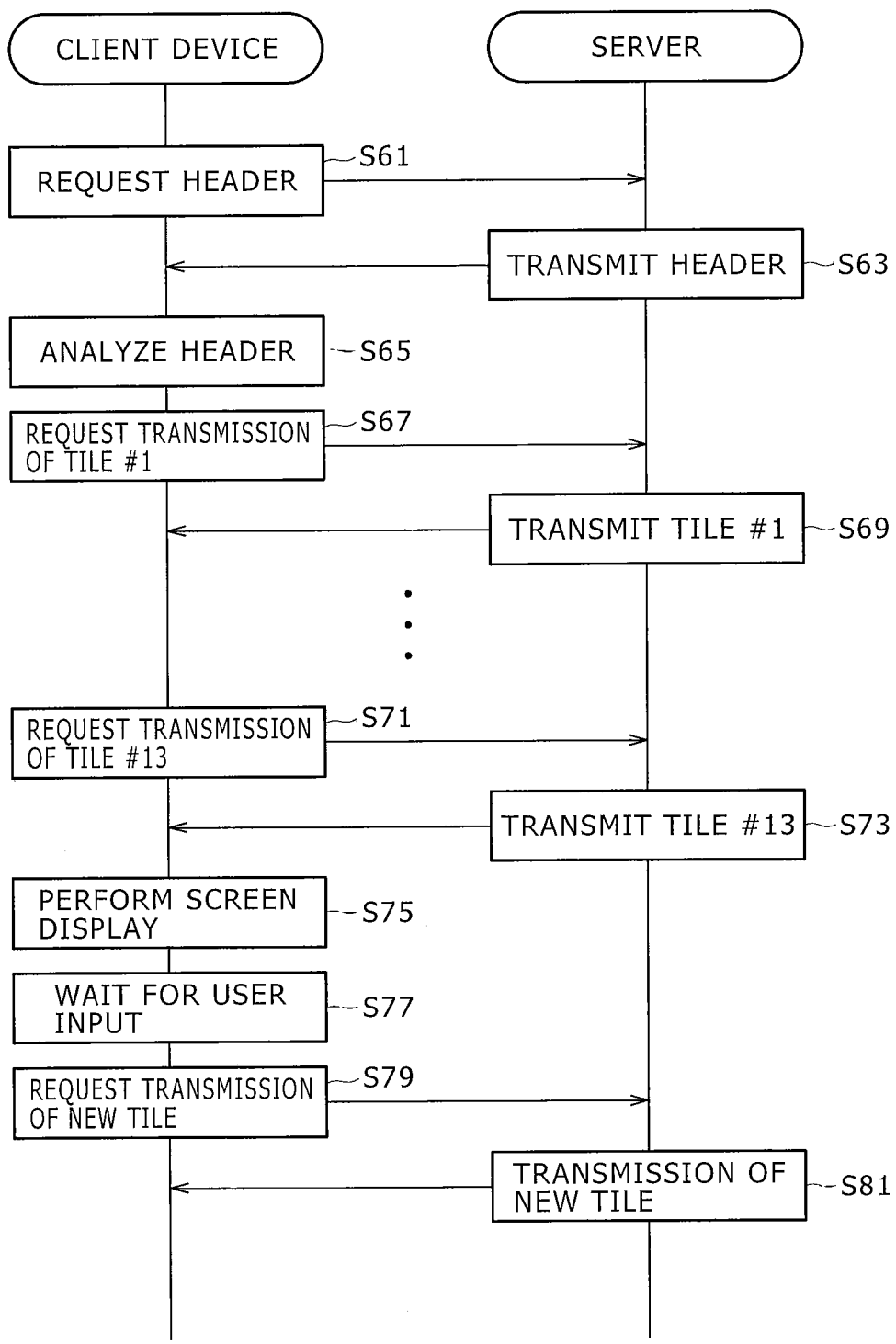
FIG. 11 is a flowchart explanatory of the underlying technology of the present disclosure.

Thereafter, the server transmits the retrieved data to the client device that has sent the request (in step S59).

Where a microscopic image is furnished with its tile numbers as shown in FIG. 3, consider the case in which the display range indicated in FIG. 7 is designated by the user's input in conjunction with the above-outlined flow of processing. FIG. 11 shows a flow of processing taking place between the server and its client in that case.

The client device first sends a request for a header to the server (in step S61). The server transmits the applicable header to the client device (in step S63). Upon receipt of the header from the server, the client device analyzes the received header (in step S65). As a result of the analysis, the client device determines that a total of nine tile images having tile numbers 1, 2, 3, 6, 7, 8, 11, 12 and 13 are needed in order to display the applicable display range.

Thereafter, the client device repeats the request for transmission of a tile image and the reception of the requested tile image in order to acquire the necessary tile images (in steps S67 to S73). Using the acquired tile images, the client device displays the user-designated display range on the screen (in step S75), and waits for the user's new input (in step S77). When a new tile image becomes necessary following a new input by the user, the client device requests transmission of the new tile image from the server (in step S79). The server transmits the requested tile image to the client device (in step S81).

Comparing the flow of processing in FIG. 8 with that in FIG. 11 reveals the following: that the retrieval of data from the storage device (e.g., HDD) in any currently proposed system made up of a server and its client devices during the process of FIG. 8 is simply replaced by reception of the retrieved data from the server via the network. In other words, in the currently proposed system composed of the server and its client devices, the application for viewing microscopic images is simply made manipulable via the network.

As is evident from the flowchart of FIG. 11, the larger the number of tile images to be acquired, the larger the number of times the data involved is exchanged between the server and its client device. This leads to the problem of a decline in responsiveness due to network response delays (round trip time (RTT)). Few techniques, if ever, have been studied for improving the response performance by paying attention to the round trip time.

Studies of methods for effectively caching tile images led to the findings that are given below. Where the traditional caching method is in use, the cache of the server caches tile image data in accordance with the indexes of the tile images (tile numbers, coordinates, etc.) requested from the client device. The cached tile image data includes the following:

data of the tile images already provided to the client device;
data of the tile images positioned near the image coordinates of the data to be provided to the client device; and
data of nearby tile images in the data file to be provided to the client device.

However, where the above caching method is adopted, it is difficult for the server to identify which range of the microscopic image is currently displayed on the client device. This renders efficient caching difficult to achieve on the side of the server. That in turn makes it necessary for the server to take measures such as utilization of a larger cache memory, which can exert greater loads on the network bandwidth and memory capacity.

Where a plurality of tile images are requested to be provided using a limited number of connections, the server responds to the requesting client device by returning the tile images successively in the order in which they were requested. In such a case, despite the fact that the cache contains tile images that can be immediately offered to the client device, the server may have to acquire data not found in the cache before sending the acquired data to the client. As a result, it may take longer for the client device to obtain all tile images. This can entail the problem of worsening responsiveness to the user's operations on the display of the client device.

Under the above circumstances, the image management server 30 and image display apparatus 40 as part of the embodiment are implemented based on the studies for minimizing the decline in response performance attributable to network response delays, thereby enhancing the convenience of the user.

Also, the image management server 30 and image display apparatus 40 to be discussed below are implemented based on the studies for boosting the speed of image display on the side of the image display apparatus 40 while minimizing the increase in the network bandwidth and memory capacity required for the transmission and reception of image data.

(1-5) Structure of the Image Management Server

Figure 12:
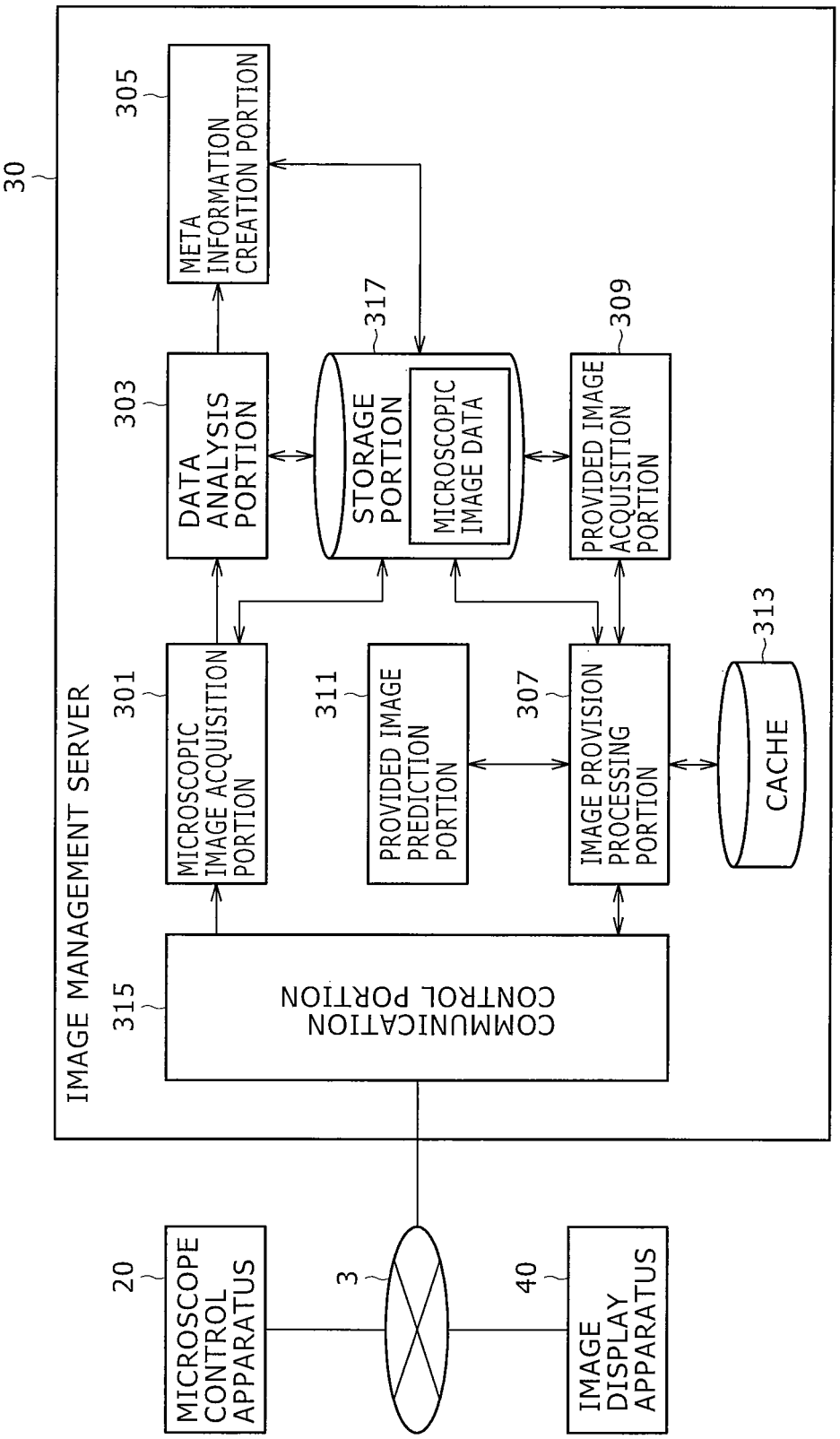
FIG. 12 is a block diagram showing a structure of an image management server as part of the embodiment.

A typical structure of the image management server 30 of the embodiment is explained below in detail with reference to FIG. 12. FIG. 12 is a block diagram showing the structure of the image management server 30 as part of the embodiment.

As shown in FIG. 12, the image management server 30 is mainly composed of a microscopic image acquisition portion 301, a data analysis portion 303, a meta information creation portion 305, an image provision processing portion 307, a provided image acquisition portion 309, a provided image prediction portion 311, a cache 313, a communication control portion 315, and a storage portion 317.

The microscopic image acquisition portion 301 may be implemented using the CPU, ROM, and RAM, for example. The microscopic image acquisition portion 301 acquires microscopic image data picked by various kinds of microscopic image pickup systems including the microscope 10 and microscope control apparatus 20 of the embodiment. The microscopic image data may include not only magnified image data representing magnified images of samples but also thumbnail image data corresponding to the thumbnail images of the samples. The microscopic image acquisition portion 301 outputs the acquired microscopic image data to the data analysis portion 303 (to be discussed later) and stores the acquired data to predetermined storage areas of the storage portion 317 (to be discussed later).

The data analysis portion 303 may be implemented using the CPU, ROM and RAM, for example. The data analysis portion 303 analyzes the microscopic image data output from the microscopic image acquisition portion 301 to determine the data format in which the microscopic image data is being stored. The result of the analysis is output from the data analysis portion 303 to the meta information creation portion 305 (to be discussed later).

In an embodiment, the data analysis portion 303 may associate the acquired result of the analysis with the corresponding microscopic image data upon storage into the storage portion 317 (to be discussed later). The data analysis portion 303 may also store history information about the analyses of microscopic image data into the storage portion 317.

The meta information creation portion 305 may be implemented using the CPU, ROM and RAM, for example. Based on the result of the analysis of microscopic image data done by the data analysis portion 303, the meta information creation portion 305 creates meta information including information about the data format of the microscopic image data. Preferably, the format of such meta information may be a structured language such as XML (Extensible Markup Language) but not limited thereto. The meta information created by the meta information creation portion 305 will be explained below in more specific terms.

The meta information creation portion 305 stores the created meta information into predetermined storage areas of the storage portion 317 in association with the corresponding microscopic image data.

The microscopic image management system 1 of the embodiment provides the meta information to the image display apparatus 40 serving as a terminal for viewing microscopic images. This setup can bring about an efficient process of providing microscopic image data.

The image provision processing portion 307 may be implemented using the CPU, ROM and RAM, for example. The image provision processing portion 307 provides a list or the like of the microscopic image data it manages to the image display apparatus 40 upon request by the latter. Also, the image provision processing portion 307 provides the managed microscopic image data itself to the image display apparatus 40 when so requested by the latter.

Furthermore, the image provision processing portion 307 can acquire various kinds of hint information from the image display apparatus 40 when offering microscopic image data to the latter. Such hint information may include information about the tile images being displayed on the display screen of the image display apparatus 40, and motion vector information representing the direction of the user's operations (i.e., direction in which the microscopic image is being viewed).

The functions of the image provision processing portion 307 will be explained below in specific terms.

Upon receipt of a request for header information from the image display apparatus 40, the image provision processing portion 307 outputs information about the corresponding microscopic image data to the provided image acquisition portion 309 (to be discussed later). When the provided image acquisition portion 309 outputs meta information associated with the corresponding microscopic image data, the image provision processing portion 307 provides the acquired meta information to the image display apparatus 40 requesting the header information.

Also, upon receipt of a request for transmission of a tile image from the image display apparatus 40, the image provision processing portion 307 outputs to the provided image acquisition portion 309 information about the tile image described in the transmission request (the information may be called the requested tile information hereunder). Alternatively, the image provision processing portion 307 may output the requested tile information to the provided image prediction portion 311 (to be discussed later). When the provided image acquisition portion 309 outputs the corresponding tile image, the image provision processing portion 307 provides the acquired tile image to the image display apparatus 40 requesting the tile image.

The method for identifying the tile image desired to be transmitted is not limited to any specific method. For example, the tile image desired to be transmitted may be identified using solely the tile number unique to the tile image of interest as shown in FIG. 3. Alternatively, where the position of each tile image is represented by plane-direction coordinates (X-Y coordinates) alone or by both plane-direction coordinates (X-Y coordinates) and focus-direction coordinates (Z-axis coordinates), the tile image desired to be transmitted may be identified using such coordinate information as well as magnification-related information.

The image provision processing portion 307 can transmit either a single or a plurality of tile images collectively to the image display apparatus 40. When transmitting a set of tile images to the image display apparatus 40, the image provision processing portion 307 may sequence the tile images to be transmitted in accordance with a predetermined criterion and transmit the tile images in the sequence thus determined.

For example, when requested by the image display apparatus 40 to transmit a plurality of tile images collectively, the image provision processing portion 307 may preferentially transmit those of the requested tile images which are found in the cache 313 (to be discussed later). Also, given a request from the image display apparatus 40 for collective transmission of a plurality of tile images, the image provision processing portion 307 may collectively transmit those of the requested tile images which share the same plane in the entire sample image but which are positioned differently in the focus direction.

Upon receipt of the above-mentioned hint information from the image display apparatus 40, the image provision processing portion 307 outputs the received hint information to the provided image prediction portion 311 (to be discussed later). If the provided image prediction portion 311 outputs prediction information about the tile images highly likely to be viewed by the user, the image provision processing portion 307 outputs the acquired prediction information to the provided image acquisition portion 309.

Also, the image provision processing portion 307 may have the cache 313 (to be discussed later) retain the actual data of the tile images sent from the provided image acquisition portion 309. In particular, the image provision processing portion 307 should preferably get the cache 313 to store the tile image data acquired on the basis of the prediction information output from the provided image prediction portion 311.

Upon acquiring the requested tile information from the image display apparatus 50, the image provision processing portion 307 first determines whether the cache 313 contains the actual data of the tile images described in the requested tile information. If the requested tile images are found to exist in the cache 313, the image provision processing portion 307 can immediately provide the image display apparatus 50 with the data held in the cache 313. If the requested tile images are not found in the cache 313, the image provision processing portion 307 requests the provided image acquisition portion 309 to acquire the requested tile images.

In an embodiment, the image provision processing portion 307 may sequence the tile images to be provided in such a manner that, for example, the tile images positioned close to the display range displayed on the image display apparatus 50 are preferentially provided. The tile images may be provided in the sequenced manner described above.

By carrying the caching process outlined above, the image provision processing portion 307 can provide the requested tile images to the image display apparatus 40 more quickly than if the tile images are to be acquired by the provided image acquisition portion 309 in accordance with the requested tile information.

The provided image acquisition portion 309 may be implemented using the CPU, ROM and RAM, for example. Based on the requested tile information output from the image provision processing portion 307, the provided image acquisition portion 309 acquires the image data to be transmitted to the image display apparatus 40 from the microscopic image data stored in predetermined areas of the storage portion 317. After acquiring the relevant image data from the storage portion 317, the provided image acquisition portion 309 outputs the acquired image data to the image provision processing portion 307. Alternatively, the provided image acquisition portion 309 may store the acquired image data directly into the cache 313 (to be discussed later).

The provided image prediction portion 311 may be implemented using the CPU, ROM and RAM, for example. Based on the requested tile information output from the image provision processing portion 307, the provided image prediction portion 311 predicts the tile images highly likely to be requested next. More particularly, the provided image prediction portion 311 predicts the tile images positioned close to the tile images described in the requested tile information (requested tile images), as the tile images highly likely to be requested next. The provided image prediction portion 311 outputs the result of the prediction to the image provision processing portion 307.

The tile images positioned close to the requested tile images include not only nearby tile images on the same plane as the requested tile images but also those in the focus direction of the requested tile images.

If the hint information is received from the image display apparatus 50 by way of the image provision processing portion 307, the provided image prediction portion 311 predicts the tile images highly likely to be requested next based on the received hint information.

For example, consider the case in which the hint information includes information representing the range currently displayed on the display screen (called the display range information hereunder). In this case, the provided image prediction portion 311 can predict the tile images positioned close to the tile images denoted by the display range information, as the tile images highly likely to be requested next.

Consider now the case in which the hint information includes motion vector information representing the direction of the user's operations (i.e., direction in which the microscopic image is being viewed) on the image display apparatus 50. Such motion vector information is assumed to include not only direction about the user's operations on the same plane as the tile images displayed on the display screen, but also direction about the user's operations such as zoom and pan in the focus direction. In this case, the provided image prediction portion 311 can predict the tile images in the motion vector direction as the tile images highly likely to be requested next.

The cache 313 may be implemented using the ROM, RAM or some other storage device, for example. The cache 313 retains the actual data of the tile images that the provided image acquisition portion 309 has acquired from suitable storage areas until the tile images are provided to the image display apparatus 50.

The communication control portion 315 may be implemented using the CPU, ROM, RAM and a suitable communication device, for example. The communication control portion 315 controls the communications conducted over the network 3 between the image management server 30 on the one hand, and the microscope control apparatus 20 and image display apparatus 40 set up outside the image management server 30 on the other hand.

The storage portion 317 is an example of the storage device attached to the image management server 30 of the embodiment. The storage portion 317 stores microscopic image data and the results of data analyses and meta information associated with the microscopic image data in storage. Also, the storage portion 317 may accommodate various kinds of history information including the history of the microscopic image data having been stored and the history of the microscopic image data that has been provided. Furthermore, the storage portion 317 may accommodate, as needed, diverse parameters to be retained during some processing by the image management server 30 of the embodiment, results of processes in progress, various databases, and programs.

The foregoing paragraphs discussed typical functions of the image management server 30 as part of the embodiment. The above-described components may be constituted using general-purpose members or circuits, or specialized hardware dedicated to the functions of the components. Alternatively, the functions of the components may all be taken over by the CPU or the like. The configuration of the components may thus be altered as needed in keeping with the state of the art in effect when the embodiment is to be implemented.

It is also possible to create a computer program for implementing the functionality of the image management server sever 30 as part of the embodiment and to install the created program in a personal computer or like equipment for execution. A recording medium which stores the computer program and from which the program can be read by computer may also be provided. The recording medium may come in diverse forms including magnetic disks, optical disks, magneto-optical disks, and flash memories. Furthermore, the above-mentioned computer program may be distributed over networks for example, without recourse to the recording medium.

(1-6) Structure of the Image Display Apparatus

Figure 13:
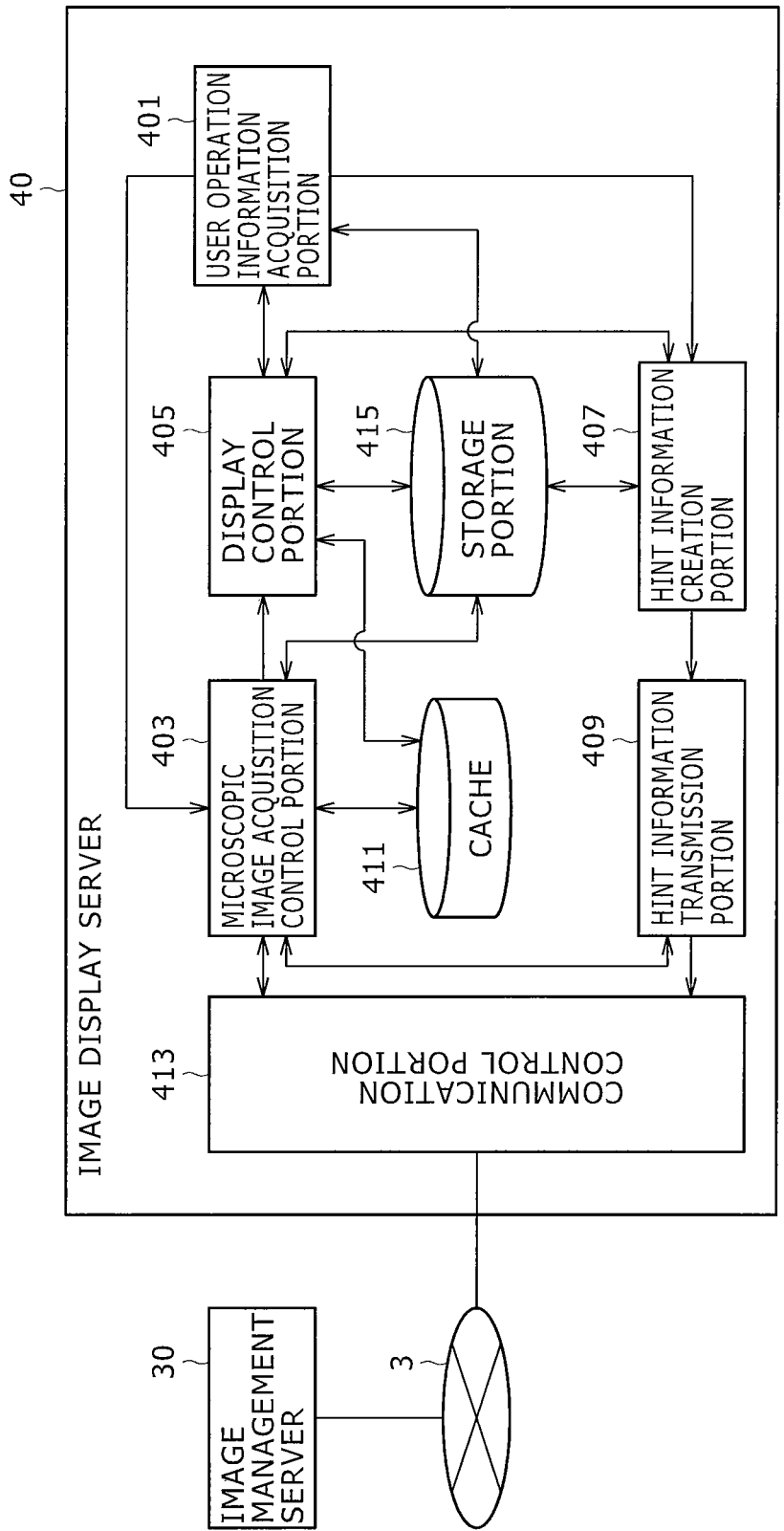
FIG. 13 is a block diagram showing a structure of an image display apparatus as part of the embodiment.
Figure 16:
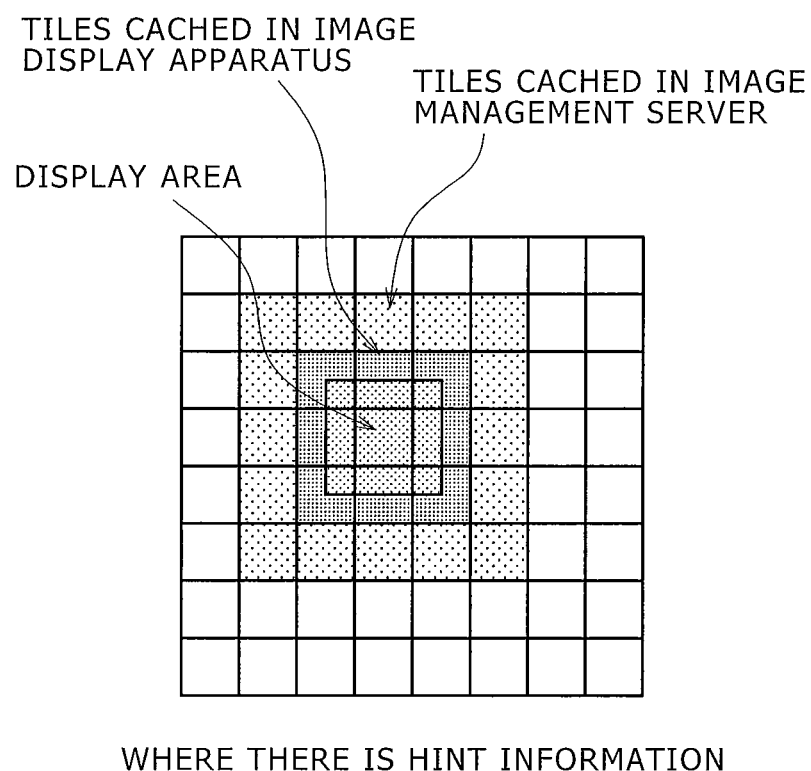
FIG. 16 is a schematic view explanatory of the method for caching tile images according to the embodiment.

The structure of the image display apparatus 40 of the embodiment is explained below in detail with reference to FIG. 13. FIG. 13 is a block diagram showing a typical structure of the image display apparatus 40 as part of the embodiment.

As shown in FIG. 13, the image display apparatus 40 is mainly composed of a user operation information acquisition portion 401, a microscopic image acquisition control portion 403, a display control portion 405, a hint information creation portion 407, a hint information transmission portion 409, a cache 411, a communication control portion 413, and a storage portion 415.

The user operation information acquisition portion 401 may be implemented using the CPU, ROM, RAM and suitable input devices, for example. The user operation information acquisition portion 401 acquires an output signal which is output from the input devices such as a keyboard, a mouse and a touch panel and which corresponds to the operations performed by the user on these devices. With the output signal acquired, the user operation information acquisition portion 401 creates user operation information representing the operations carried out by the user (i.e., user operations). The user operation information acquisition portion 401 outputs the created user operation information to the microscopic image acquisition control portion 403, display control portion 405, and hint information creation portion 407, to be discussed below. Alternatively, the user operation information acquisition portion 401 may store the created user operation information to the storage portion 415 (to be discussed later) as history information.

The operations performed by the user on the input devices such as the keyboard, mouse and touch panel may constitute the process of selecting microscopic images or the process of changing the display range for a given microscopic image, for example. The user's operations, including but not limited to these examples, are converted to the user operation information which represents the operations in question and which is output to various processing portions.

The microscopic image acquisition control portion 403 may be implemented using the CPU, ROM and RAM, for example. In response to the user operation information output from the user operation information acquisition portion 401 designating the start of acquisition of a list of microscopic images, the microscopic image acquisition control portion 403 acquires from the image management server 30 the list of the microscopic images managed by that server 30. When the microscopic image of a given sample is selected by the user's operations, the microscopic image acquisition control portion 403 transmits to the image management server 30 a request for transmission of meta information about the selected microscopic image.

When a certain area of the microscopic image desired to be viewed by the user is selected by the user's operations through the use of thumbnail images for example, the microscopic image acquisition control portion 403 identifies the tile images making up the applicable area based on the acquired meta information or the like. Then the microscopic image acquisition control portion 403 transmits information about the identified tile images to the image management server 30 as requested tile information.

The requested tile information transmitted by the microscopic image acquisition control portion 403 may identify the tile images using numbers unique to the tile images in question (i.e., tile numbers) or by utilizing the coordinates (e.g., X-Y or X-Y-Z axis coordinates) denoting the positions of the tile images as well as the image magnifications.

Also, the requested tile information may contain one or a plurality of items of information identifying the tile image or images desired to be acquired singly or collectively. If there is only one item of information attached to and identifying each requested tile image, then attempting to acquire a plurality of tile images will involve outputting a plurality of items of requested tile information to the image management server 30. When a plurality of items of information identifying requested tile images are included collectively in the requested tile information, the corresponding multiple tile images can be acquired collectively.

Upon acquiring the tile image data output from the image management server 30, the microscopic image acquisition control portion 403 stores the acquired data into the cache 411 (to be discussed later). Alternatively, the microscopic image acquisition control portion 403 may store the acquired tile image data into the storage portion 415.

The display control portion 405 may be implemented using the CPU, ROM and RAM, for example. The display control portion 405 controls the display screen appearing on a display device attached to the image display apparatus 40 as part of the embodiment. Also, the display control portion 405 changes the content displayed on the display screen in accordance with the user operation information output from the user operation information acquisition portion 401.

When the microscopic image acquisition control portion 403 outputs information about a list of microscopic images, the display control portion 405 displays on the display screen a list of microscopic images that can be viewed by the user on the basis of the output information. If user operation information is output to designate the start of microscopic image display, the display control portion 405 displays the microscopic image of the sample on the display screen by use of the tile images held in the cache 411 (to be discussed later) or the like. If user operation information is output to designate changes of the display range appearing on the display screen, the display control portion 405 moves accordingly the tile images in the plane direction (crosswise and lengthwise) as well as in the focus direction (zoom and pan) within the display screen.

Furthermore, the display control portion 405 identifies the tile images being displayed on the display screen, and outputs information about the displayed tile images to the microscopic image acquisition control portion 403 as well as to the hint information creation portion 407 (to be discussed later). This allows the microscopic image acquisition control portion 403 and hint information creation portion 407 to identify the tile images currently displayed on the display screen of the image display apparatus 40.

The display control portion 405 can also select various kinds of information retained in the cache 411 and storage portion 415 as the content to be displayed on the display screen of the image display apparatus 40.

The hint information creation portion 407 may be implemented using the CPU, ROM and RAM, for example. Based on at least either the user operation information output from the user operation information acquisition portion 401 or the information about the display screen content acquired from the display control portion 405, the hint information creation portion 407 creates hint information indicating the content of a microscopic image display process currently performed by the image display apparatus 40. The image management server 30 utilizes the hint information when predicting the tile images highly likely to be requested next.

For example, the hint information creation portion 407 may identify the tile images being displayed on the display screen using the information about the content displayed on the display screen, and create information about the tile images displayed on the display screen as the hint information.

Also, based on the user operation information output from the user operation information acquisition portion 401, the hint information creation portion 407 identifies a motion vector representing the direction of the user's operations (i.e., direction in which the microscopic image is viewed). Thereafter, the hint information creation portion 407 can create information denoting the identified motion vector as the hint information. It is assumed that the motion vector includes the user's operations not only on the same plane as the tile images displayed on the display screen but also in the focus direction such as zoom and pan.

The hint information creation portion 407 outputs the hint information thus created to the hint information transmission portion 409 (to be discussed later). Alternatively, the hint information creation portion 407 may place the created hint information itself or history information about the hint information thus created into the storage portion 415 (to be discussed later).

The hint information transmission portion 409 may be implemented using the CPU, ROM and RAM, for example. The hint information transmission portion 409 transmits the hint information created by the hint information creation portion 407 to the image management server 30 by way of the communication control portion 413 (to be discussed later).

Alternatively, in concert with the microscopic image acquisition control portion 403, the hint information transmission portion 409 may transmit the above-described hint information to the image management server 30 along with requested tile information.

Even if the microscopic image acquisition control portion 403 does not transmit various kinds of information to the image management server 30, the hint information transmission portion 409 can transmit the hint information to the image management server 30 as separate, independent packets. This enables the image display apparatus 40 to transmit the hint information frequently to the image management server 30. As a result, based on the transmitted hint information, the image management server 30 can predict more accurately the images to be provided so that the user of the image display apparatus 40 may be offered an agreeable operating environment.

The timing at which the hint information transmission portion 409 transmits hint information is explained below using examples.

The hint information transmission portion 409 transmits packets carrying the hint information to the image management server 30 by use of one or a combination of the following conditions:

(Condition a) Control by Time (Condition a-1) The hint information transmission portion 409 transmits the hint information if the image display apparatus 40 has not sent tile acquisition packets (i.e., requested tile information) to the image management server 30 beyond a preset time period (t1). (Condition b) Control by change in the coordinates designating the display range.

(Condition b-1) If the display coordinates of the display range displayed on the display screen of the image display apparatus 40 are changed, the hint information transmission portion 409 transmits solely the hint information even where the images to be displayed are all found in the cache 411 of the image display apparatus 40.

(Condition b-2) The hint information transmission portion 409 transmits the hint information under the above condition b-1 but at a thinned-out timing such as once every "n" (e.g., three) times the condition is met.

It should be noted that the timing at which the hint information transmission portion 409 transmits the hint information is not limited to the above examples. The hint information transmission portion 409 can transmit the hint information to the image management server 30 at any desired timing.

The cache 411 may be implemented using the ROM, RAM or some other storage device, for example. The cache 411 retains the actual data of the tile images that the microscopic image acquisition control portion 403 has acquired from the image management server 30. The actual data of the tile images held in the cache 411 may be used as needed by the display control portion 405 in displaying the tile images on the display screen of a suitable display device.

The communication control portion 413 may be implemented using the CPU, ROM, RAM and a suitable communication device, for example. The communication control portion 413 controls the communications conducted over the network 3 between the image display apparatus 40 on the one hand, and the image management server 30 set up outside the image display apparatus 40 on the other hand.

The storage portion 415 is an example of the storage device attached to the image display apparatus 40 of the embodiment. The storage portion 415 stores the microscopic image data acquired from the image management server 30 and the results of data analyses and meta information associated with the microscopic image data in storage. Also, the storage portion 415 may accommodate various kinds of history information including the history of the microscopic image data having been acquired. Furthermore, the storage portion 415 may accommodate, as needed, diverse parameters to be retained during some processing by the image display apparatus 40 of the embodiment, results of processes in progress, various databases, and programs.

The foregoing paragraphs discussed typical functions of the image display apparatus 40 as part of the embodiment. The above-described components may be constituted using general-purpose members or circuits, or specialized hardware dedicated to the functions of the components. Alternatively, the functions of the components may all be taken over by the CPU or the like. The configuration of the components may thus be altered as needed in keeping with the state of the art in effect when the embodiment is to be implemented.

It is also possible to create a computer program for implementing the functionality of the image display apparatus 40 as part of the embodiment and to install the created program in a personal computer or like equipment for execution. A recording medium which stores the computer program and from which the program can be read by computer may also be provided. The recording medium may come in diverse forms including magnetic disks, optical disks, magneto-optical disks, and flash memories, for example. Furthermore, the above-mentioned computer program may be distributed over networks for example, without recourse to the recording medium.

(1-7) Examples of Meta Information

The meta information used by the image management server 30 and image display apparatus 40 of the embodiment are explained below in specific terms with reference to FIGS. 14 to 15I. FIGS. 14 to 15I are tabular views explanatory of the meta information as the header information about microscopic image data.

FIG. 14 shows an example of meta information created in XML by the image management server 30 as part of the embodiment. By analyzing the microscopic image data uploaded from the microscope control apparatus 20, the image management server 30 of the embodiment can create meta information such as is shown in FIG. 14 describing various kinds of information about microscopic images.

The meta information created by the image management server 30 describes various kinds of information such as pickup magnifications, lighting conditions, and compression quality as shown in FIG. 14. The image display apparatus 40 can easily grasp the characteristics of microscopic image data by referencing such meta information provided by the image management server 30.

FIGS. 15A to 15I explain in detail the elements described in the meta information indicated in FIG. 14. As is evident from FIGS. 15A and 15B, "gimage" elements include numerous items of information determining microscopic images such as their pickup magnifications, lighting conditions, and compression quality. Thus in the meta information such as is shown in FIG. 14, the "gimage" elements should preferably be described as required items. Besides the elements indicated in FIGS. 15A to 15I, desired elements such as a "description" element giving an explanation of a given microscopic image may be defined and described as meta information.

In the tables shown in FIGS. 15A to 15I, the items noted "required" should preferably be included either as meta information or as elements contained in the meta information. Also in the tables shown in FIGS. 15A to 15I, the items noted "optional" are the items that may be omitted as meta information or as elements contained in the meta information. The notations "required" and "optional" are only examples and not limited to the contents described in FIGS. 15A to 15I.

The above-mentioned meta information is created by the image management server 30 analyzing microscopic image data. It follows that meta information can also be created for the microscopic images picked up by a system other than the microscope system that includes the microscope 10 and microscope control apparatus 20 of the embodiment. Thus the image management server 30 of the embodiment can also manage the microscopic images of samples picked up by any system other than the microscope system of the embodiment.

The image management server 30 creates meta information by analyzing the data format of microscopic image data. That means it is easy for the image management server 30 to alter or update the file format.

(1-8) Examples of Information Exchanged Between the Image Display Apparatus and the Image Management Server Various kinds of information exchanged between the image display apparatus 40 and the image management server 30 are briefly explained below using specific examples.

Request Information and Response Information

As described above, the tile image files used by the image display apparatus 40 for image display purposes are typically managed using the tile numbers specific to the tile images, and each tile is typically composed of a JPEG image.

The protocol of the requested tile information sent from the image display apparatus 40 to the image management server 30 is structured by three kinds of information: tile numbers (tile ID's), display coordinates (X, Y, Zoom) on the image display apparatus 40, and the currently displayed motion vector as shown below. The display coordinates on the image display apparatus 40 and the motion vector are optional and may be omitted.

Request (requested tile information): image display apparatus 40→image management server 30
   tileid=0, 1, 2 & view=0, 0, 0 & vect=1, 1, 0

The response information returned by the image management server 30 in response to the request information above is described using the following protocol, for example:

Response: image management server 30→image display apparatus 40

```
tileid = 0, offset = 100, size = 100
tileid = 1, offset = 200, size = 100
tileid = 2, offset = 300, size = 100
<tileid 0 data>
<tileid 1 data>
<tileid 2 data>
```

The image management 30 can also describe the response information using the protocol shown below for example, by taking into consideration the priorities of the tile images to be provided, i.e., by changing the sequence of the tile images as will be explained later.

Response: image management server 30→image display apparatus 40

```
tileid = 1, offset = 100, size = 100
tileid = 2, offset = 200, size = 100
tileid = 0, offset = 300, size = 100
<tileid 1 data>
<tileid 2 data>
<tileid 0 data>
```

Hint Information

The hint information sent from the image display apparatus 40 to the image management server 30 can be described using the protocol shown below for example. In the ensuing example, the coordinates (view) indicating the content currently displayed on the image display apparatus 40 and the motion vector (vect) involved are described as hint information.

Hint: image display apparatus 40→image management server 30
   view=0, 0, 0 & vect=1, 1, 0

The details of diverse kinds of information transmitted and received between the image display apparatus 40 and the image management server 30 as described above are only examples and are not limitative of the protocol for these kinds of information exchanged therebetween.

(1-9) Tile Image Caching Method

A typical method used by the image management server 30 to provide tile images is explained below in specific terms with reference to FIGS. 16 to 19. FIGS. 16 to 19 are schematic views explanatory of a typical tile image caching method of the embodiment.

As mentioned above, using the result of the prediction made by the provided image prediction portion 311 and before receiving any request from the image display apparatus 40, the image management server 30 acquires the tile images highly likely to be requested next and places the acquired tile images into the cache 313.

Consider the case in which the image display apparatus 40 transmits hint information designating the range currently displayed by the image display apparatus 40. With the image display apparatus 40 typically displaying on its display screen the display range shown in FIG. 16, the cache 411 of the image display apparatus 40 caches the tile image data covering the display range indicated in FIG. 16. And because the image display apparatus 40 transmits the hint information designating its currently displayed range, the image management server 30 can store beforehand in the cache 313 the tile images close to the currently displayed range as the tile images highly likely to be requested next.

Consider now the case in which the image display apparatus 40 transmits hint information about a motion vector. With the image display apparatus 40 typically displaying on its display screen the display range shown in FIG. 16, the cache 411 of the image display apparatus 40 caches the tile image data covering the display range indicated in FIGS. 17 and 18.

At this point, the image management server 30 can predict changes in the display screen on the image display apparatus 40 on the basis of the hint information about the motion vector sent from the image displaying apparatus 40. As a result, the image management server 30 can determine that the tile images positioned in the direction of motion vector movement are highly likely to be requested next. This allows the image management server 30 to cache beforehand in the cache 313 a plurality of tile images positioned in the direction of motion vector movement as the tile images highly likely to be requested next.

Figure 17:
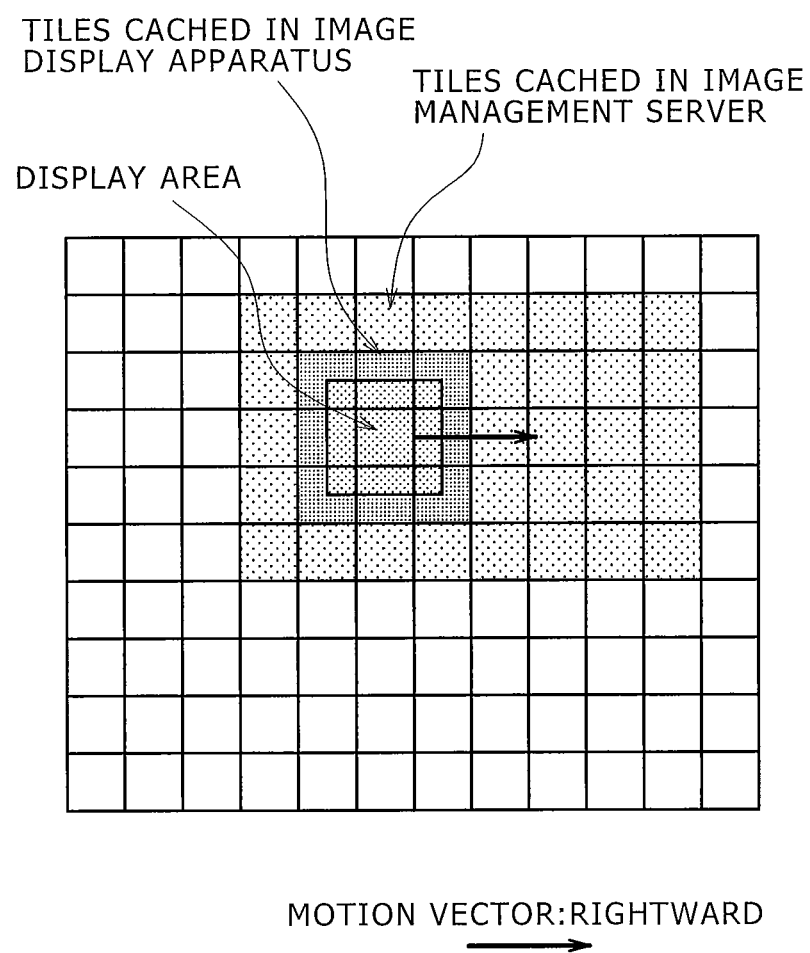
FIG. 17 is a schematic view explanatory of the method for caching tile images according to the embodiment.
Figure 18:
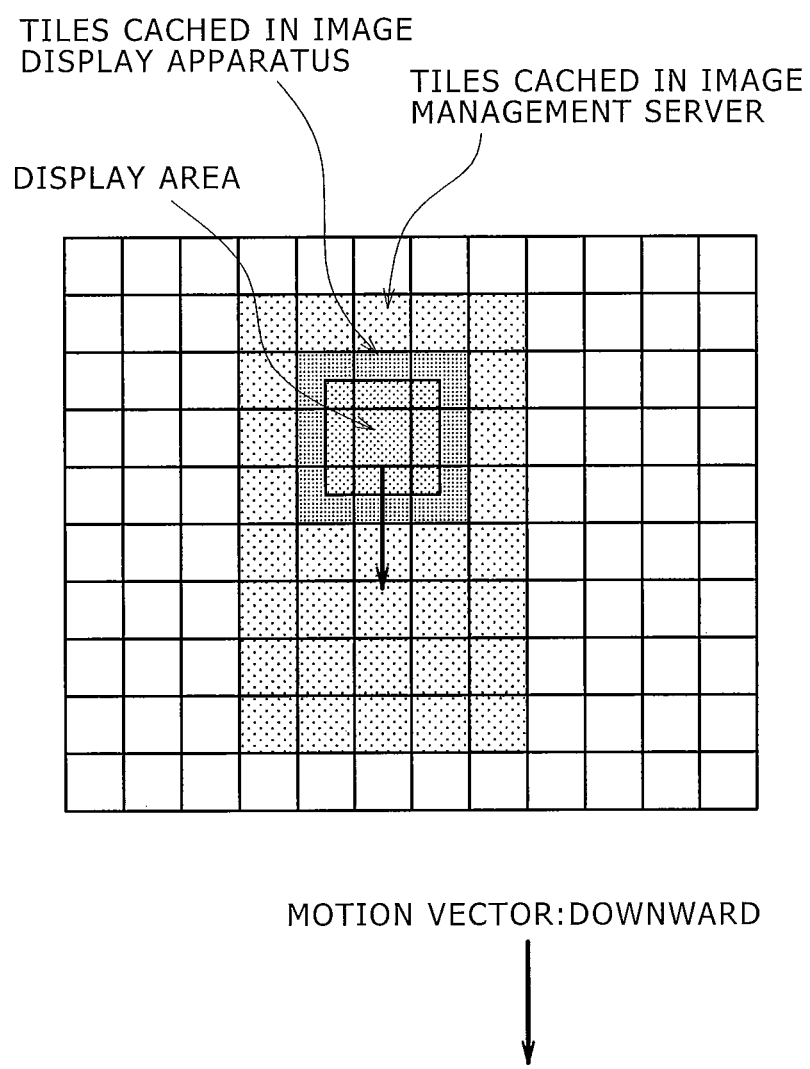
FIG. 18 is a schematic view explanatory of the method for caching tile images according to the embodiment.

That is, in the example of FIG. 17, the image management server 30 can determine that the tile images positioned to the right of the display range are highly likely to be requested next on the basis of the direction of motion vector movement. Thus the image management server 30 caches beforehand a generous amount of tile images positioned to the right of the display range. Likewise, in the example of FIG. 18, the image management server 30 can determine that the tile images positioned under the display range are highly likely to be requested next on the basis of the direction of motion vector movement. The image management server 30 thus caches beforehand a generous amount of tile images positioned under the display range.

Figure 19:
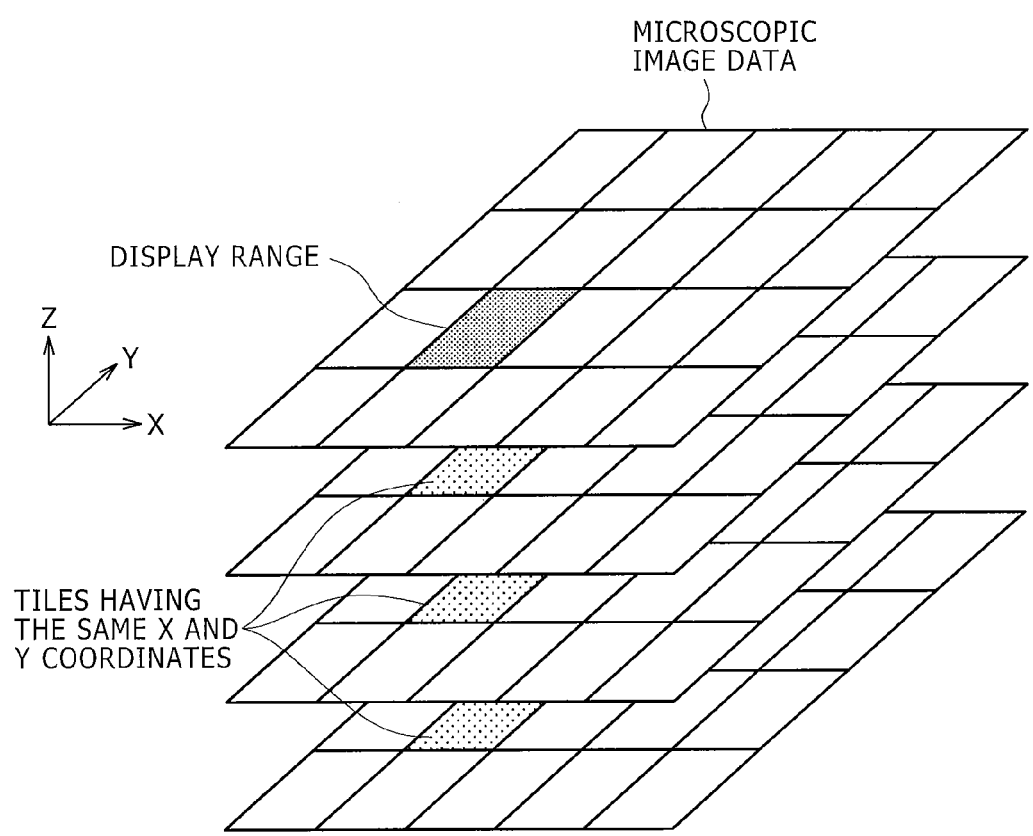
FIG. 19 is a schematic view explanatory of the method for caching tile images according to the embodiment.

In terms of movement, the motion vector is not limited to the plane direction and may take the focus direction into account. For example, consider the case where the tile image such as is shown in FIG. 19 constitutes the display range and where the motion vector moves in the Z-axis direction of FIG. 19. In that case, it may be determined that the tile images having the same X-Y axis coordinates but with different Z-axis coordinates as shown in FIG. 19 are highly likely to be requested next. Thus the image management server 30 can cache beforehand in the cache 313 a plurality of tile images positioned in the direction of motion vector movement as the tile images highly likely to be requested next.

If there exist microscopic image data having different magnifications, the image management server 30 can determine in which direction the motion vector is moving (i.e., zoom-in or zoom-out) so as to predict the tile images highly likely to be requested next.

Priorities of the Tile Images to be Provided

The image provision processing portion 307 of the image management server 30 can prioritize the tile images to be provided to the image display apparatus 40 and preferentially provide the tile images that meet predetermined conditions as discussed above.

Now consider the case where information A and information B described below about tile images are used as the information for determining the sequence in which to provide tile images to the image display apparatus 40.

(A) Information about the tile images found in the cache 313 of the image management server 30 (cache information)

(B) Information about the tile images found within the display range identified by the hit information denoting the current display position on the image display apparatus 40

Based on the above two kinds of information (A and B), the image provision processing portion 307 of the image management server 30 can determine the priorities of tile images in the manner explained below, for example.

Example 1

Where Both Cache Information and Hint Information are to be Used (Priority 1) Tile images applicable to both A and B
(Priority 2) Tile images applicable to A but not to B
(Priority 3) Tile images applicable not to A but to B
(Priority 4) Tile images applicable to neither A nor B Example 2

Where Only the Cache Information is to be Used (Priority 1) Tile images applicable to A
(Priority 2) Tile images not applicable to A The image management server 30 prioritizes the tile images to be provided to the image display apparatus 40 as described above. This enables the image management server 30 preferentially to provide those tile images desired more than the others by the image display apparatus 40 or the tile images that can be immediately provided.

(1-10) Flow of the Image Viewing Method

Explained below in reference to FIGS. 20 to 27 is the flow of a typical image viewing method implemented between the image management server 30 and the image display apparatus 40 of the embodiment. FIGS. 20 to 27 are flowcharts outlining the image viewing method implemented by the embodiment.

Flow of the Imaging Acquisition Method—Part 1

Figure 20:
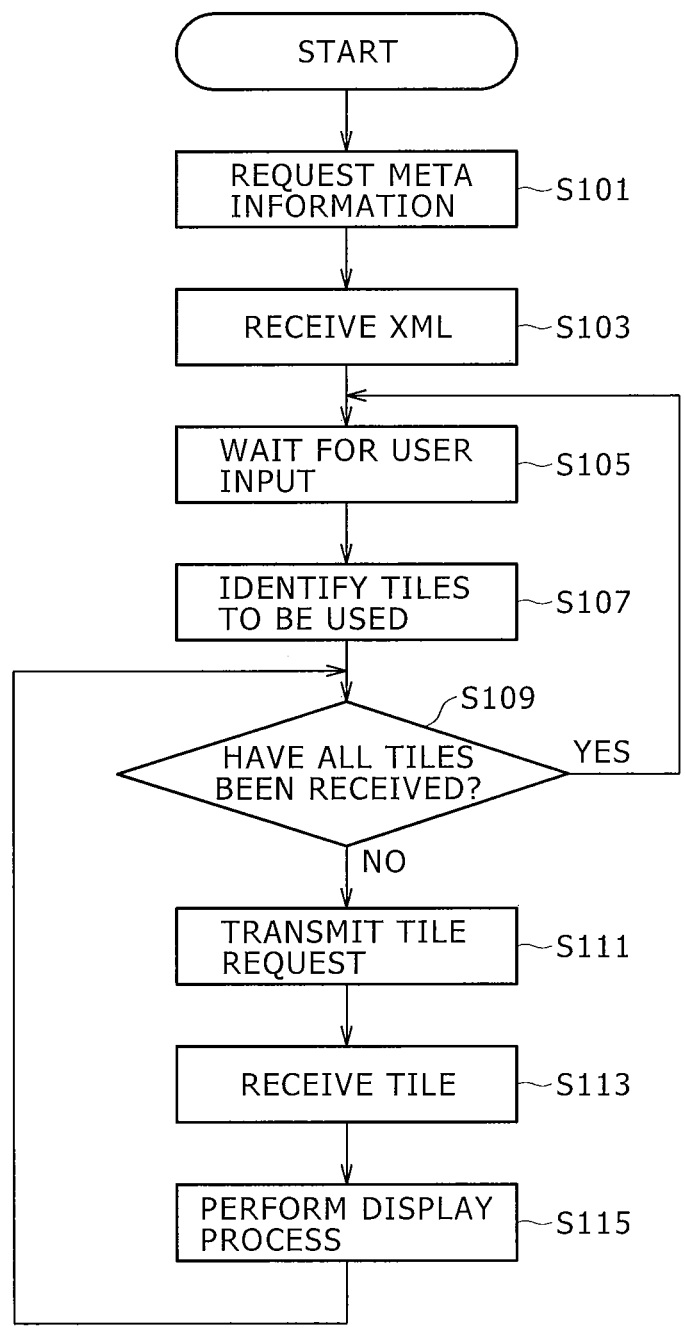
FIG. 20 is a flowchart showing steps making up an image acquisition method according to the embodiment.

The flow of a typical image acquisition method implemented by the image display apparatus 40 of the embodiment is first explained below in reference to FIG. 20.

Prior to the ensuing explanation, it is assumed that the microscopic image acquisition control portion 403 of the image display apparatus 40 has acquired from the image management server 30 a list of the microscopic images managed by the server 30.

Given the user operation information output from the user operation information acquisition portion 401, the microscopic image acquisition control portion 403 of the image display apparatus 40 detects that the user has designated the sample desired to be viewed. The microscopic image acquisition control portion 403 then transmits a request to acquire meta information about the applicable microscopic image data to the image management server 30 (in step S101).

Thereafter, the microscopic image acquisition control portion 403 of the image display apparatus 40 receives the meta information (XML) from the image management server 30 (in step S103), and waits for the user's input (in step S105).

When that part of the microscopic image which the user desires to view is designated by the user's operations, the microscopic image acquisition control portion 403 identifies the tile images corresponding to the image part desired to be viewed by the user (in step S107). Based on information about the identified tile images, the microscopic image acquisition control portion 403 determines whether all tile images have been received (in step S109).

If it is determined that all tile images have yet to be received, the microscopic image acquisition control portion 403 transmits to the image management server 30 the requested tile information about a tile image yet to be received (in step S111) and receives the tile image sent from the image management server 30 (in step S113). The display control portion 405 then performs the process of displaying the received tile image (in step S115). Thereafter, the microscopic image acquisition control portion 403 returns to step S109 and determines whether all tile images have been received.

If in step S109 all tile images are determined to have been received, the microscopic image acquisition control portion 403 returns to step S105 and waits for the user's input.

Flow of the Image Provision Method—Part 1

Figure 21:
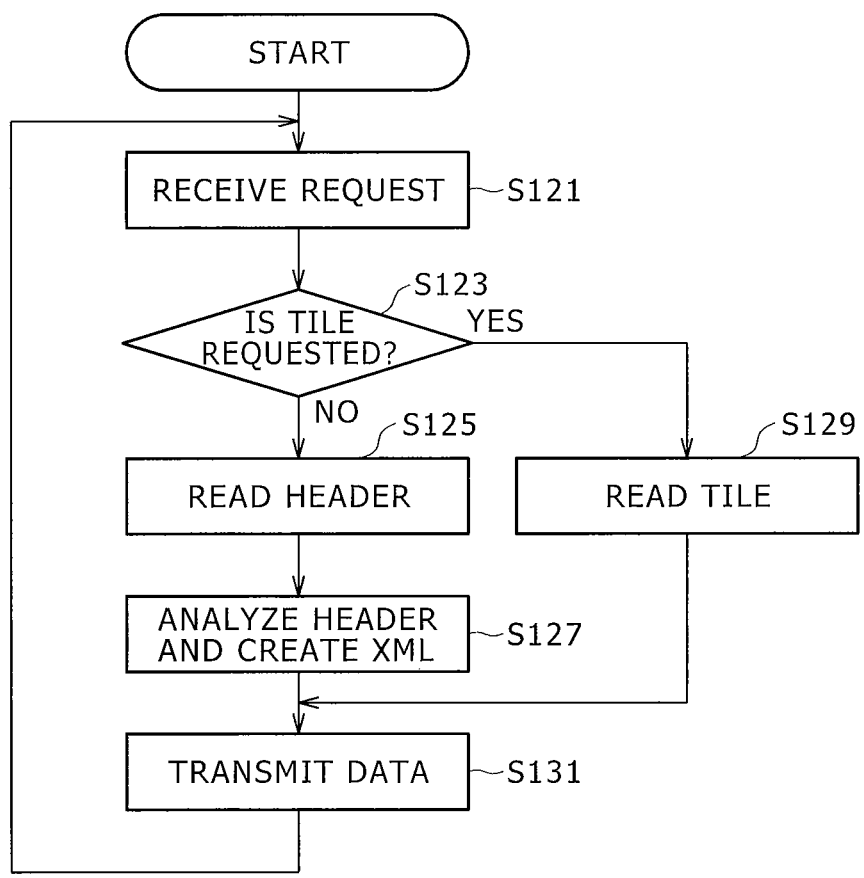
FIG. 21 is a flowchart showing steps making up the image acquisition method according to the embodiment.

The flow of a typical image provision method implemented by the image management server 30 of the embodiment is next explained below in reference to FIG. 21.

Upon receipt of a request sent from the image display apparatus 40 (in step S121), the image provision processing portion 307 of the image management server 30 determines the content of the received request (in step S123).

If the request sent from the image display apparatus 40 is not a tile image request, the image provision processing portion 307 determines that the image display apparatus 40 is requesting header information and reads the header from a suitable storage area (in step S125). Then the image management server 30 analyzes the header and creates XML as needed (in step S127), before reaching step S131 (to be discussed later).

If the request sent from the image display apparatus 40 turns out to be a tile image request, the image provision processing portion 307 reads the applicable tile image from a suitable storage area (in step S129).

Then the image provision processing portion 307 of the image management server 30 transmits the retrieved data to the image display apparatus 40 that has transmitted the request (in step S131).

Flow of the Image Viewing Method—Part 1

Figure 22:
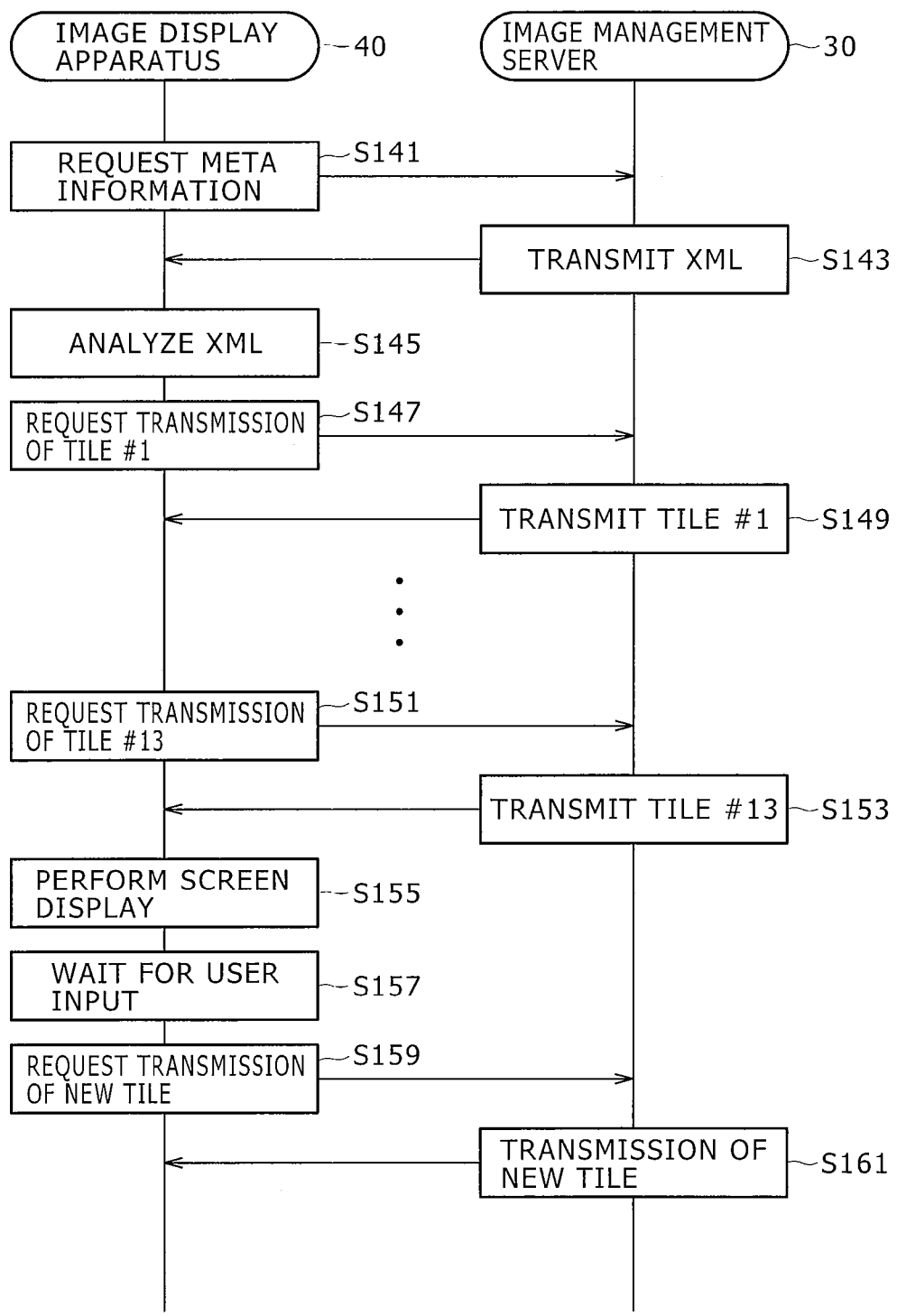
FIG. 22 is a flowchart showing steps making up the image acquisition method according to the embodiment.

Assuming that the steps above are carried out in the sequence described above, consider the case in which the user's input designates the display range such as is shown in FIG. 7 regarding the microscopic image furnished with its tile numbers as indicated in FIG. 3. FIG. 22 shows the flow of steps carried out in such a case between the image management server 30 and the image display apparatus 40.

The microscopic image acquisition control portion 403 of the image display apparatus 40 transmits a meta information request to the image management server 30 (in step S141). The image provision processing portion 307 of the image management server 30 transmits the applicable meta information (XML) to the image display apparatus 40 (in step S143). The microscopic image acquisition control portion 403 of the image display apparatus 40 analyzes the meta information (XML) sent from the image management server 30 (in step S145). This allows the microscopic image acquisition control portion 403 of the image display apparatus 40 to determine that a total of nine tile images having tile numbers 1, 2, 3, 6, 7, 8, 11, 12 and 13 are needed in order to display the applicable display screen.

Thereafter, the microscopic image acquisition control portion 403 repeats the request for transmission of a tile image and the reception of the requested tile image in order to acquire the necessary tile images (in steps S147 to S153). Using the acquired tile images, the display control portion 405 of the image display apparatus 40 displays the user-designated display range on the screen (in step S155). The user operation information acquisition portion 401 of the image display apparatus 40 waits for the user's new input (in step S157). When a new tile image becomes necessary following a new input by the user, the microscopic image acquisition control portion 403 requests transmission of the new tile image from the image management server 30 (in step S159). The image provision processing portion 307 of the image management server 30 transmits the requested tile image to the image display apparatus 40 (in step S161).

Flow of the Image Acquisition Method—Part 2

Figure 23:
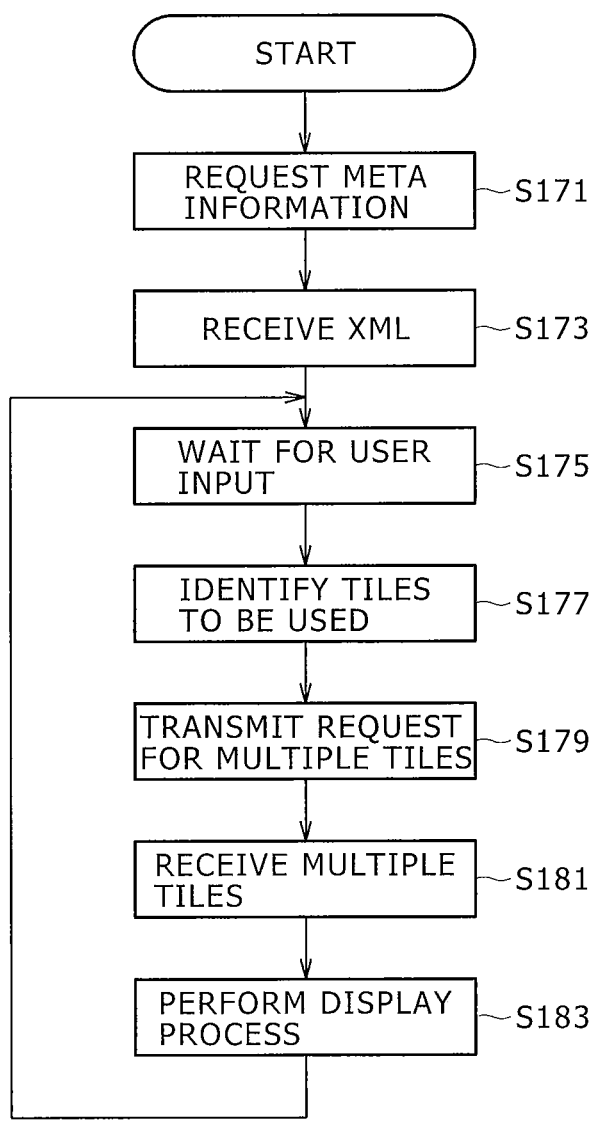
FIG. 23 is a flowchart showing steps making up the image acquisition method according to the embodiment.

Explained below in reference to FIG. 23 is the flow of a typical image acquisition method implemented by the image display apparatus 40 for requesting a plurality of tile images collectively.

Given the user operation information output from the user operation information acquisition portion 401, the microscopic image acquisition control portion 403 of the image display apparatus 40 detects that the user has designated the sample desired to be viewed. The microscopic image acquisition control portion 403 then transmits a request to acquire meta information about the applicable microscopic image data to the image management server 30 (in step S171).

Thereafter, the microscopic image acquisition control portion 403 of the image display apparatus 40 receives the meta information (XML) from the image management server 30 (in step S173), and waits for the user's input (in step S175).

When that part of the microscopic image which the user desires to view is designated by the user's operations, the microscopic image acquisition control portion 403 identifies the tile images corresponding to the image part desired to be viewed by the user (in step S177). Based on information about the identified tile images, the microscopic image acquisition control portion 403 transmits to the image management server 30 requested tile information requesting all identified tile images (in step S179).

The microscopic image acquisition control portion 403 then receives the multiple tile images sent from the image management server 30 (in step S181). The display control portion 405 proceeds to perform the process of displaying the received tile images. Thereafter, the microscopic image acquisition control portion 403 returns to step S175 and waits for the user's input.

Flow of the Image Provision Method—Part 2

Figure 24:
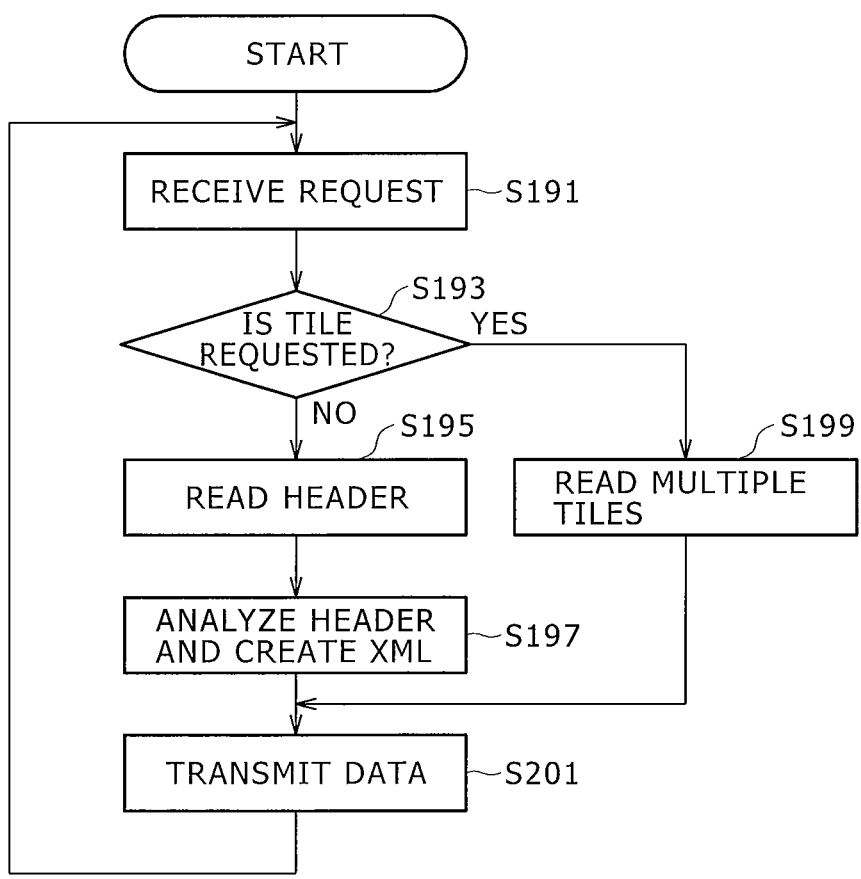
FIG. 24 is a flowchart showing steps making up the image acquisition method according to the embodiment.

Explained below in reference to FIG. 24 is the flow of a typical image provision method implemented by the image management server 30 upon receipt of a request for collective transmission of a plurality of tile images.

Upon receiving a request sent from the image display apparatus 40 (in step S191), the image provision processing portion 307 of the image management server 30 determines the content of the received request (in step S193).

If the request sent from the image display apparatus 40 is not a tile image request, the image provision processing portion 307 determines that the image display apparatus 40 is requesting header information and reads the header from a suitable storage area (in step S195). Then the image management server 30 analyzes the header and creates XML as needed (in step S197), before reaching step S201 (to be discussed later).

If the request sent from the image display apparatus 40 turns out to be a request for a plurality of tile images, the image provision processing portion 307 reads all applicable tile images from suitable storage areas (in step S199).

Then the image provision processing portion 307 of the image management server 30 transmits the retrieved data to the image display apparatus 40 that has transmitted the request (in step S201).

Flow of the Image Viewing Method—Part 2

Figure 25:
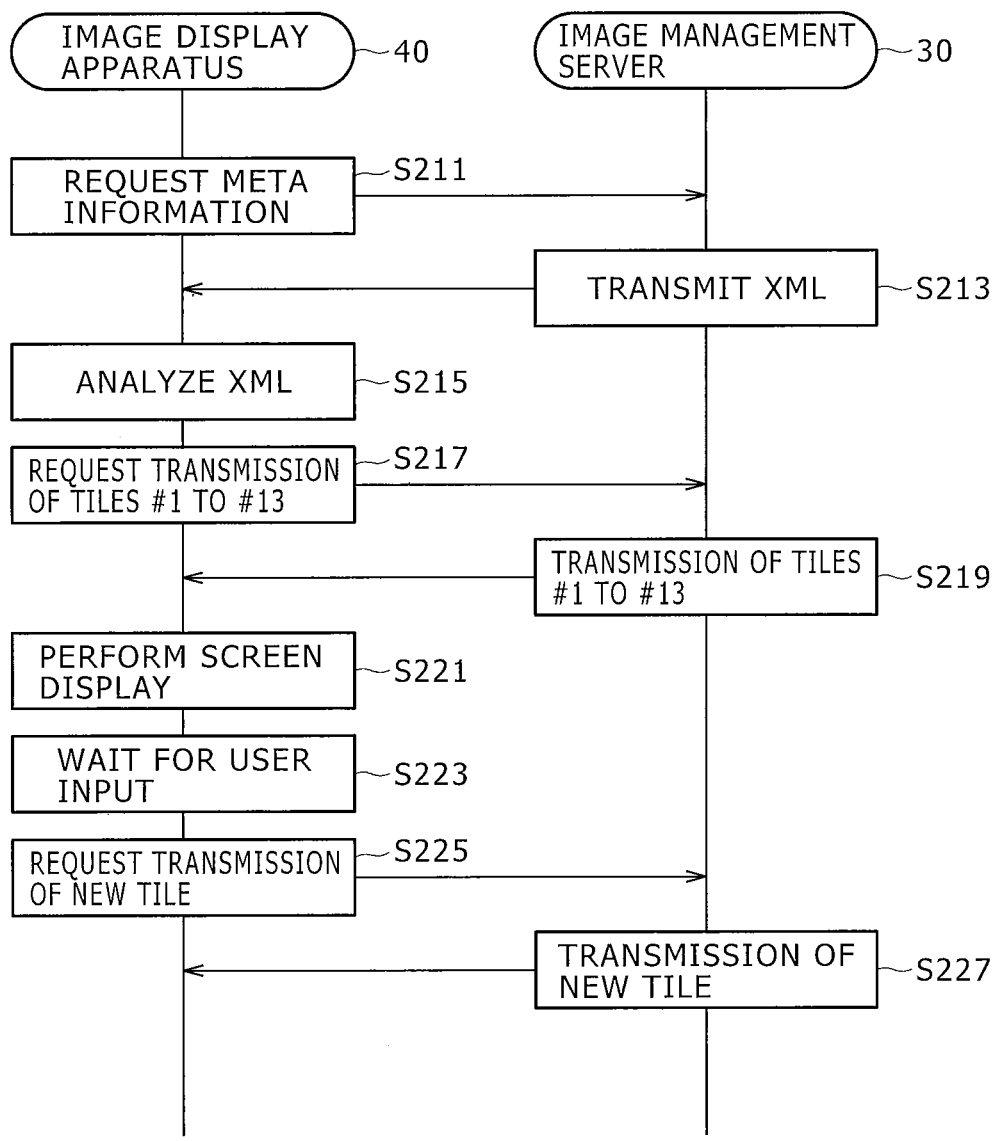
FIG. 25 is a flowchart showing steps making up the image acquisition method according to the embodiment.

Assuming that the steps above are carried out in the sequence described above, consider the case in which the user's input designates the display range such as is shown in FIG. 7 regarding the microscopic image furnished with its tile numbers as indicated in FIG. 3. FIG. 25 shows the flow of steps carried out in such a case between the image management server 30 and the image display apparatus 40.

The microscopic image acquisition control portion 403 of the image display apparatus 40 transmits a meta information request to the image management server 30 (in step S211). The image provision processing portion 307 of the image management server 30 transmits the applicable meta information (XML) to the image display apparatus 40 (in step S213). The microscopic image acquisition control portion 403 of the image display apparatus 40 analyzes the meta information (XML) sent from the image management server 30 (in step S215). This allows the microscopic image acquisition control portion 403 of the image display apparatus 40 to determine that a total of nine tile images having tile numbers 1, 2, 3, 6, 7, 8, 11, 12 and 13 are needed in order to display the applicable display screen.

Thereafter, the microscopic image acquisition control portion 403 transmits to the image management server 30 a request for transmission of all nine tile images in order to acquire the necessary tile images (in step S217). Upon receipt of the request for the transmission of the multiple tile images, the image provision processing portion 307 of the image management server 30 provides all requested tile images to the image display apparatus (in step S219). Using the acquired tile images, the display control portion 405 of the image display apparatus 40 displays the user-designated display range on the screen (in step S221). The user operation information acquisition portion 401 of the image display apparatus 40 waits for the user's new input (in step S223). When a new tile image becomes necessary following a new input by the user, the microscopic image acquisition control portion 403 requests transmission of the new tile image from the image management server 30 (in step S225). The image provision processing portion 307 of the image management server 30 transmits the requested tile image to the image display apparatus 40 (in step S227).

Flow of the Image Acquisition Method—Part 3

Figure 26:
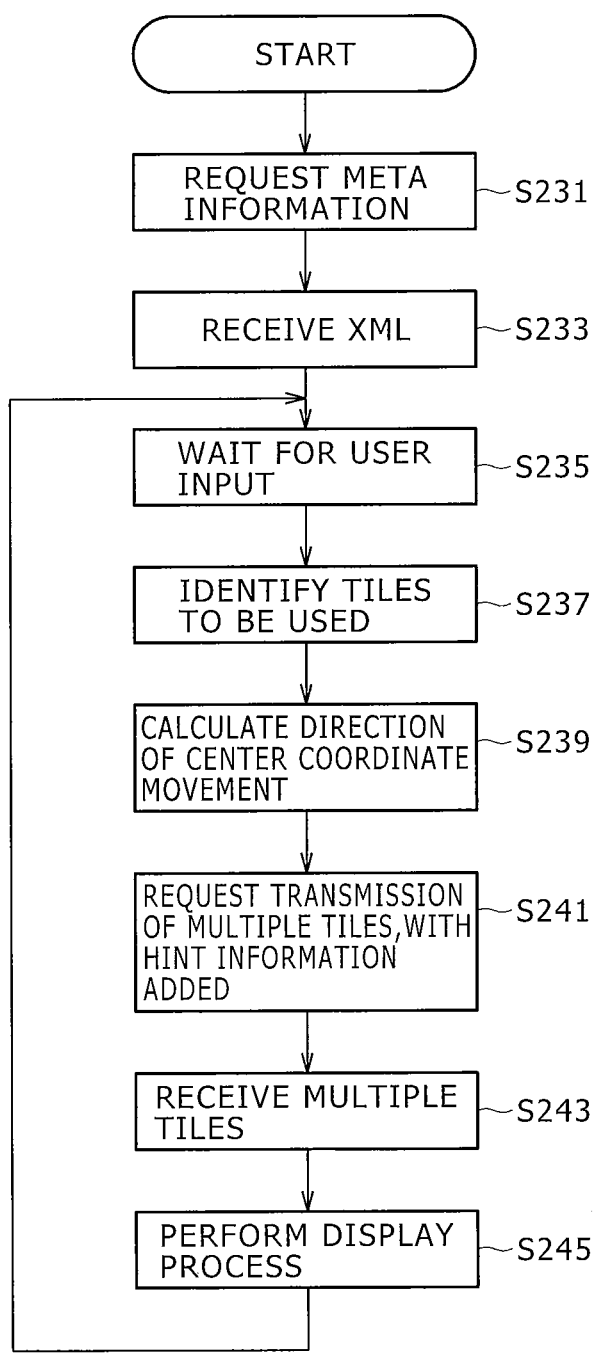
FIG. 26 is a flowchart showing steps making up the image acquisition method according to the embodiment.

Explained below in reference to FIG. 26 is the flow of a typical image acquisition method implemented by the image display apparatus 40 for transmitting hint information to the image management server 30 along with a tile image request.

Given the user operation information output from the user operation information acquisition portion 401, the microscopic image acquisition control portion 403 of the image display apparatus 40 detects that the user has designated the sample desired to be viewed. The microscopic image acquisition control portion 403 then transmits a request to acquire meta information about the applicable microscopic image data to the image management server 30 (in step S231).

Thereafter, the microscopic image acquisition control portion 403 of the image display apparatus 40 receives the meta information (XML) from the image management server 30 (in step S233), and waits for the user's input (in step S235).

When that part of the microscopic image which the user desires to view is designated by the user's operations, the microscopic image acquisition control portion 403 identifies the tile images corresponding to the image part desired to be viewed by the user (in step S237). If part of the microscopic image of the sample of interest is already displayed on the display screen of the image display apparatus 40, the hint information creation portion 407 may typically calculate the moving direction of the center coordinates of the currently displayed region (in step S239) in order to create hint information about the motion vector involved.

Then, the microscopic image acquisition control portion 403 and hint information transmission portion 409 work in concert with each other to transmit to the image management server 30 requested tile information requesting all tile images created on the basis of the information about the identified tile images as well as the created hint information about the motion vector (in step S241).

Thereafter, the microscopic image acquisition control portion 403 receives a plurality of tile images sent from the image management server 30 (in step S243). The display control portion 405 performs the process of displaying the received tile images (in step S245). The microscopic image acquisition control portion 403 then returns to step S235 and waits for the user's input.

Flow of the Image Provision Method—Part 3

Figure 27:
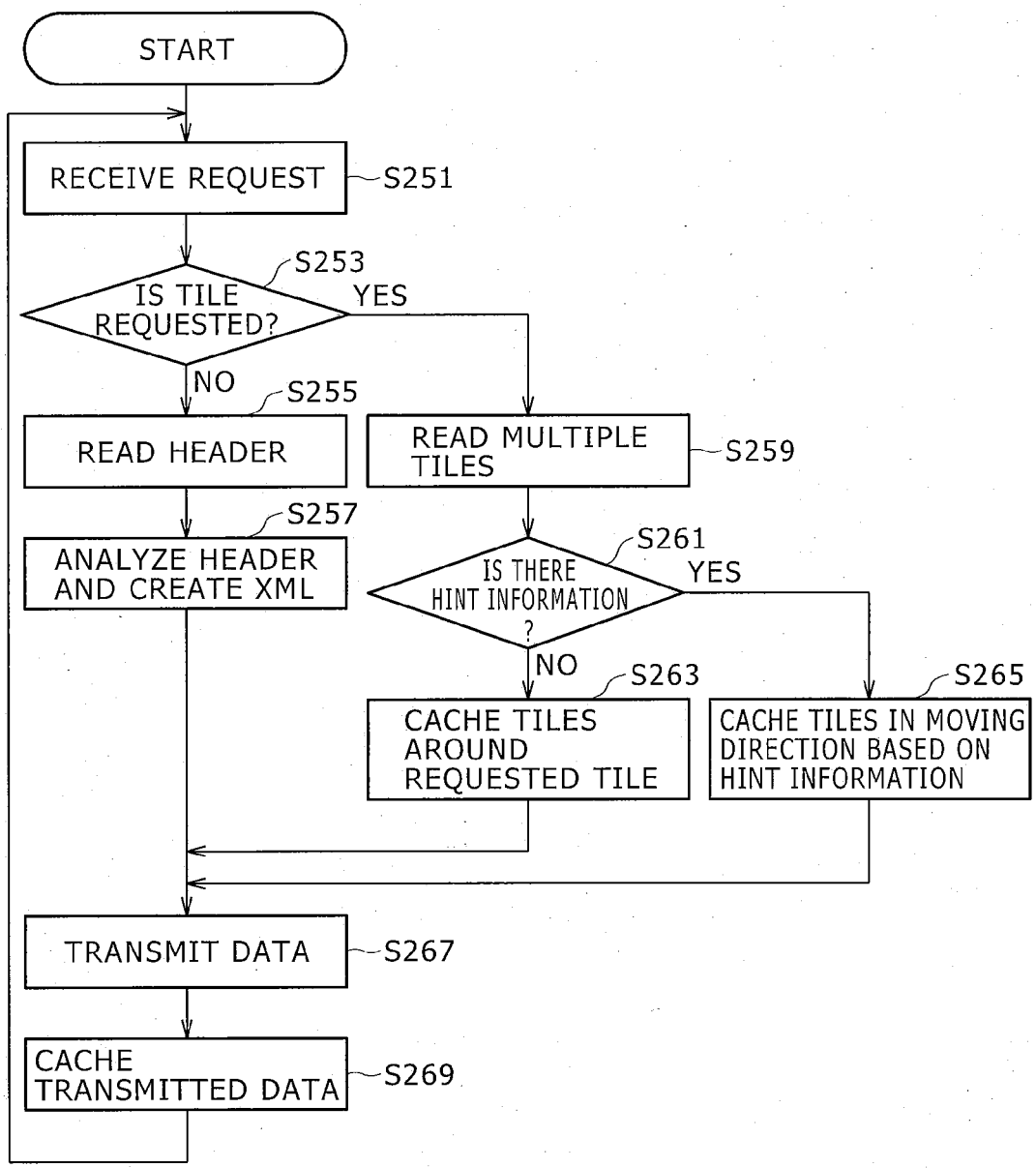
FIG. 27 is a flowchart showing steps making up the image acquisition method according to the embodiment.

Explained below in reference to FIG. 27 is the flow of a typical image provision method implemented by the image management server 30 when hint information is transmitted along with request information.

The image provision processing portion 307 of the image management server 30 receives a request sent from the image display apparatus 40 (in step S251). With the request received, the image provision processing portion 307 determines the content of the received request (in step S253).

If it is determined that the request sent from the image display apparatus 40 is not a tile image request, the image provision processing portion 307 determines that the image display apparatus 40 is requesting header information and thus reads the header from a suitable storage area (in step S255). The image management server 30 proceeds to analyze the header and create XML as needed (in step S257) before carrying out step S267 (to be discussed later).

If the request sent from the image display apparatus 40 turns out to be a request for a plurality of tile images, the image provision processing portion 307 reads all applicable tile images from suitable storage areas (in step S259). The image provision processing portion 307 then determines whether any hint information is attached to the received request information (in step S261).

If no hint information is determined to be attached, the provided image prediction portion 311 determines that the tile images positioned close to the requested tile images are highly likely to be requested next. The provided image acquisition portion 309 then caches the applicable tile images (in step S263) before performing step S267 (to be discussed later).

If hint information is determined to be attached, the provided image prediction portion 311 determines that the tile images in the moving direction are highly likely to be requested next on the basis of the hint information. The provided image acquisition portion 309 proceeds to cache the applicable tile images (in step S265) before carrying out step S267 (to be discussed later).

Thereafter, the image provision processing portion 307 of the image management server 30 transmits the retrieved data to the image display apparatus 40 that has sent the request (in step S267) and caches the transmitted data (in step S269).

When the above-described flow of steps is carried out, the microscopic image management system of the embodiment can minimize any decline in response performance attributable to network response delays thereby enhancing the convenience of the user.

(2) HARDWARE STRUCTURE

Figure 28:
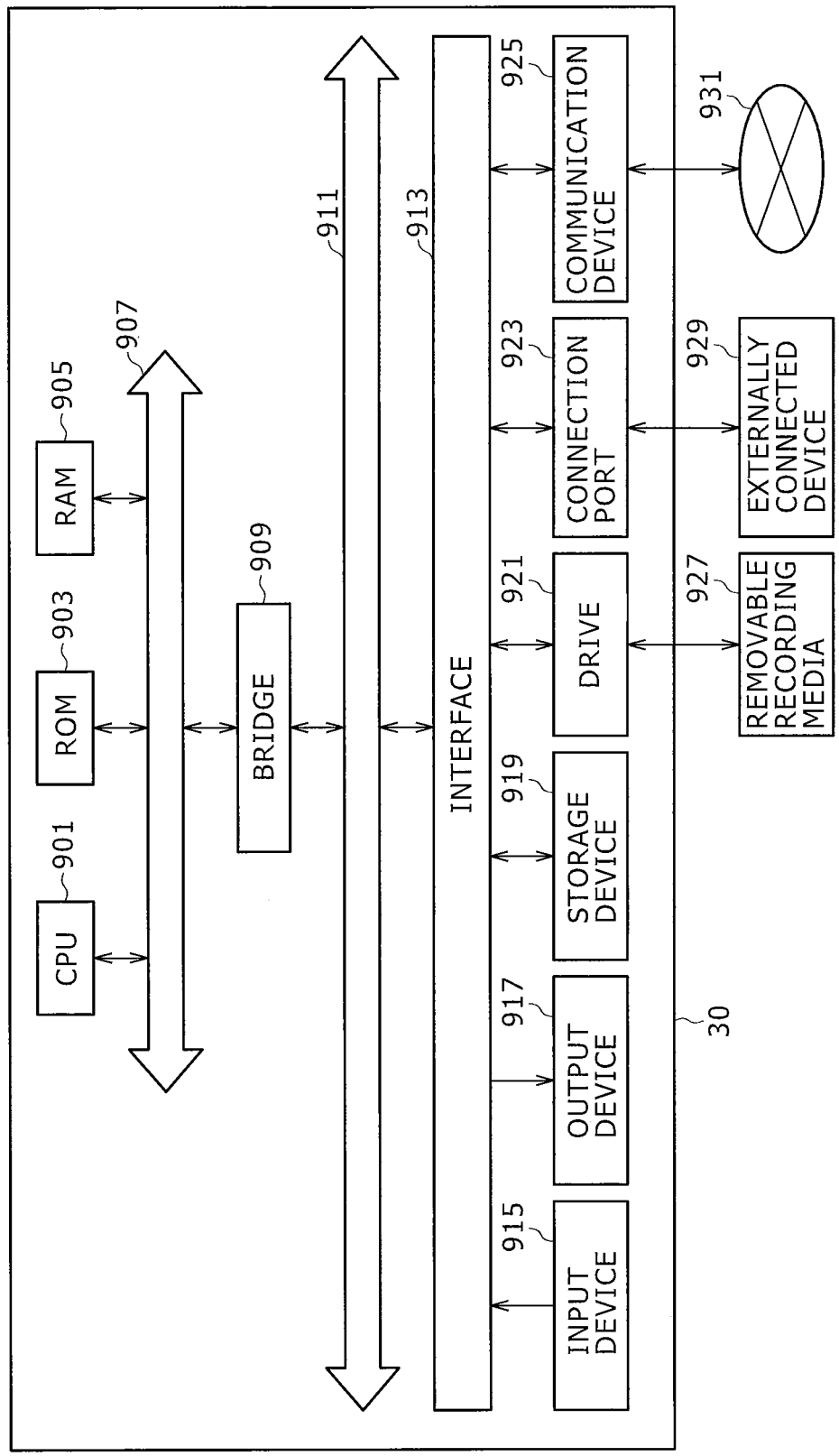
FIG. 28 is a block diagram showing a hardware structure of the image management server as part of the embodiment.

A typical hardware structure of the image management server 30 according to the embodiment is explained below in detail with reference to FIG. 28. FIG. 28 is a block diagram showing a hardware structure of the image management server 30 of the embodiment.

The image management server 30 is mainly composed of a CPU 901, a ROM 903, and a RAM 905. The image management server 30 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit controlling part or all of the workings inside the image management server 30 in accordance with various programs recorded on the ROM 903, RAM 905, storage device 919, or a removable recording medium 927. The ROM 903 stores the programs, operation parameters and other resources used by the CPU 901. The RAM 905 serves as primary storage of the programs executed by the CPU 901 and of the parameters that may vary during program execution as needed. These devices are interconnected via a host bus 907 typically formed by an internal bus such as the CPU bus.

The host bus 907 is connected to the external bus 911 such as a PCI (Peripheral Component Interconnect/Interface) bus by way of the bridge 909.

The input device 915 is operating means operated by the user, such as a mouse, a keyboard, a touch panel, buttons, switches, levers and other controls. The input device 915 may be remote control means (so-called remote controller) utilizing infrared rays or radio waves. The input device 915 may also be an externally connectable device 929 such as a mobile phone or PDA responding to the operations performed on the image management server 30. Furthermore, the input device 915 may include input control circuits that create an input signal based on the information input by the user operating the above-mentioned operating means and output the created signal to the CPU 901. By suitably operating the input device 915, the user of the image management server 30 can input diverse kinds of data or designate processing operations to the server 30.

The output device 917 is structured using a device capable of informing the user of acquired information visually or audibly. Such a device may be any one of display devices including a CRT (cathode ray tube) display device, a liquid display device, a plasma display device, an EL (electroluminescence) display device, and lamps, and of audio output devices such as speakers or headphones; a printer, a mobile phone, or a facsimile. For example, the output device 917 may output the results of diverse processes carried out by the image management server 30. More specifically, the display device may output in text or image format the results of the processes performed by the image management server 30. The audio output device may convert the audio signal formed by reproduced audio or acoustic data into an analog signal that is output.

The storage device 919 is a device for data storage structured as a typical storage portion of the image management server 30. For example, the storage device 919 may be composed of a magnetic storage device such as a hard disk drive (HDD), a semiconductor storage device, an optical storage device, or a magneto-optical storage device. The storage device 919 stores the programs and data executed by the CPU 901 as well as diverse kinds of data acquired from the outside.

The drive 921 is a reader/writer for use with recording media and is incorporated in or attached externally to the image management server 30. The drive 921 is loaded with a removable recording medium 927 such as a magnetic disk, an optical disk, a magneto-optical disk or a semiconductor memory; reads information from the loaded medium 927; and outputs the retrieved information to the RAM 905. Also, the drive 921 can write information to the loaded removable recording medium 927. Furthermore, the removable recording medium 927 may be any one of DVD (Digital Versatile Disk) media, HD-DVD (High-Definition Digital Versatile Disk) media, and Blu-ray media. The removable recording medium 927 may also be a Compact Flash (CF; registered trademark), a flash memory, an SD (Secure Digital) memory card, an IC (integrated circuit) card carrying a noncontact IC chip, or some other suitable electronic device.

The connection port 923 is a port that directly connects a device to the image management server 30. Examples of the connection port 923 include a USB (Universal Serial Bus) port, an IEEE 1394 port, and a SCSI (Small Computer System Interface) port. Other examples of the connection port 923 are an RS-232C port, an optical audio terminal, and an HDMI (High-Definition Multimedia Interface) port. Directly connecting the externally connectable device 929 to the connection port 923 allows the image management server 30 to acquire various kinds of data from the connected device 929 and to provide diverse data to the device 929 to the port 923.

The communication device 925 may typically be a communication interface structured with a device connecting to a communication network 931 for communication purposes. For example, the communication device 925 may be a communication card for a wired or wireless LAN (local area network), Bluetooth (registered trademark), or WUSB (Wireless USB). Also, the communication device 925 may be an optical communication router, an ADSL (Asymmetric Digital Subscriber Line) router, or a modem for various kinds of communications. The communication device 925 can send and receive signals to and from, say, the Internet or other communication devices in accordance with a predetermined protocol such as TCP/IP. The communication network 931 connected with the communication device 925 may be composed of a wired or wireless network such as the Internet, a household LAN, an infrared ray communication system, a radio wave communication system, or a satellite communication system.

The foregoing paragraphs described examples of the hardware components that can implement the functions of the image management server 30 as part of the embodiment. These components may be structured using general-purpose members or specialized hardware dedicated to the functions of the components. Thus, it is possible to alter the configuration of the components as needed in keeping with the state of the art in effect when the embodiment is implemented.

The hardware structure of the microscope control apparatus 20 and that of the image display apparatus 40 are substantially the same as the hardware structure of the image management server 30 of the embodiment and thus will not be discussed further.

(3) CONCLUSION

As described above, the embodiment of the present disclosure enables the image management server to predict and cache the images highly likely to be requested next based on the hint information sent from the image display apparatus. This can significantly lower the cache capacity in the image display apparatus and contribute to reducing such resource requirements as memory capacity and network bandwidth.

Because a plurality of images are allowed to be exchanged collectively and altered in sequence when transmitted, as needed, the delay time for returning data in response to requests may be reduced. Even where much response delays are pronounced, high-speed image display can be implemented. Furthermore, when predictive caching is implemented by the image management server that has a relatively larger memory or storage capacity than the image display apparatus, it is possible to carry out prefetching of the data constituting a wider image area than if caching is performed by the image display apparatus alone. This enables the image display apparatus to provide high-speed display.

Because the image management server 30 analyzes microscopic image data and creates meta information thereabout, the microscopic image management system of the embodiment can also manage data picked up by a microscope system different from that of the embodiment. Since it is the image management server 30 that analyzes microscopic image data and creates meta information, the image management server 30 can alter or update the file format within its closed environment.

It is to be understood that while the disclosure has been described in detail in conjunction with a specific embodiment with reference to the accompanying drawings, it is evident that many alternatives, modifications and variations will become apparent to those skilled in the art in light of the foregoing description. Accordingly, it is intended that the present disclosure embrace all such alternatives, modifications and variations as fall within the spirit and scope of the appended claims.

The invention is claimed as follows:

1. An image management server comprising:
   a microscopic image acquisition portion configured to acquire a microscopic image of a sample made of a plurality of tile images picked up by a microscope before placing the acquired microscopic image into a predetermined storage area;
   a meta information creation portion configured to create meta information determining the microscopic image in accordance with a result of data analysis performed on said microscopic image acquired by said microscopic image acquisition portion;

an image provision processing portion configured to provide said meta information and said microscopic image to an image display apparatus in response to a request from said image display apparatus capable of viewing microscopic images; and a provided image prediction portion configured to predict the tile image highly likely to be requested by said image display apparatus based on hint information which is transmitted from said image display apparatus and which represents content of a microscopic image display process performed by said image display apparatus.

2. The image management server according to claim 1, wherein, if said hint information includes information about the tile image displayed on a display screen of said image display apparatus, then said provided image prediction portion predicts a tile image positioned near said tile image displayed on said display screen, as the tile image highly likely to be requested by said image display apparatus.

3. The image management server according to claim 1, wherein, if said hint information includes information about a motion vector representing the direction of a user operation on said image display apparatus, then said provided image prediction portion predicts a tile image positioned in the direction of said motion vector as the tile image highly likely to be requested by said image display apparatus.

4. The image management server according to claim 1, further comprising:

a cache configured to store at least either said tile image predicted by said provided image prediction portion or said tile image provided to said image display apparatus.

5. The image management server according to claim 1, wherein, if there exist a plurality of tile images to be provided to said image display apparatus, then said image provision processing portion prioritizes said plurality of tile images to be provided and provides said tile images sequentially in order of priority to said image display apparatus.

6. The image management server according to claim 5, wherein said image provision processing portion classifies said tile images requested by said image display apparatus into the tile images held in said cache and the tile images not held therein so that the tile images stored in said cache may be provided preferentially.

7. The image management server according to claim 1, wherein, if said microscopic image is made up of the tile images in a plane direction and of the tile images in a focus direction and if one of the tile images in the plane direction is requested, then said image provision processing portion provides the requested tile image as well as a tile image which is in the same position as the requested tile image in the plane direction and which is in a different position therefrom in the focus direction.

8. The image management server according to claim 1, wherein, if a plurality of tile images are demanded by said image display apparatus in a single request, then said image provision processing portion provides said plurality of tile images collectively to said image display apparatus.

9. An image display apparatus comprising:

a microscopic image acquisition control portion configured to control the acquisition of a microscopic image of a sample made of a plurality of tile images and picked up by a microscope, from an image management server managing microscopic images;

a display control portion configured to control the display, on a display screen, of said microscopic image acquired by said microscopic image acquisition control portion;

a hint information creation portion configured to create hint information representing content of a display process for displaying said microscopic image on said display screen, based on at least one of information output from said display control portion and displayed on said display screen regarding said microscopic image and user operation information about an operation performed by a user; and a hint information transmission portion configured to transmit said hint information created by said hint information creation portion to said image management server.

10. The image display apparatus according to claim 9, wherein, based on said user operation information, said hint information creation portion identifies a motion vector representing the direction of the user operation on said image display apparatus and acquires information about said motion vector as said hint information.

11. The image display apparatus according to claim 9, wherein said hint information transmission portion transmits said hint information as well as information requesting the provision of said tile images to said image management server.

12. The image display apparatus according to claim 11, wherein said hint information transmission portion transmits said hint information to said image management server independently of the information requesting the provision of said tile images.

13. The image display apparatus according to claim 9, wherein said microscopic image acquisition control portion acquires from said image management server meta information determining said microscopic image and, based on the acquired meta information, identifies the tile image desired to be acquired.

14. The image display apparatus according to claim 9, wherein said microscopic image acquisition control portion identifies the tile image desired to be acquired, using either an identification number which is specific to each of said tile images and which denotes the desired tile image, or the coordinates of said desired tile image within said microscopic image and a magnification ratio of said microscopic image.

15. The image display apparatus according to claim 9, wherein said microscopic image acquisition control portion requests a plurality of tile images desired to be acquired in a single request.

16. An image provision method comprising:

acquiring a microscopic image of a sample made of a plurality of tile images picked up by a microscope before placing the acquired microscopic image into a predetermined storage area;

creating meta information determining the microscopic image in accordance with a result of data analysis performed on the acquired microscopic image;

providing said meta information and said microscopic image to an image display apparatus in response to a request from said image display apparatus capable of viewing microscopic images; and predicting the tile image highly likely to be requested by said image display apparatus based on hint information which is transmitted from said image display apparatus and which represents content of a microscopic image display process performed by said image display apparatus.

17. An image acquisition method including:
acquiring a microscopic image of a sample made of a plurality of tile images and picked up by a microscope, from an image management server managing microscopic images;
displaying, on a display screen, the acquired microscopic image;
creating hint information representing content of a display process for displaying said microscopic image on said display screen, based on at least one of information displayed on said display screen regarding said microscopic image and user operation information about an operation performed by a user; and
transmitting the created hint information to said image management server.

18. A computer program product stored on a non-transitory computer readable storage medium that when executed by a processor performs steps for causing a computer to implement:
a microscopic image acquisition function acquiring a microscopic image of a sample made of a plurality of tile images picked up by a microscope before placing the acquired microscopic image into a predetermined storage area;
a meta information creation function creating meta information determining the microscopic image in accordance with a result of data analysis performed on said microscopic image acquired by said microscopic image acquisition function;
an image provision processing function providing said meta information and said microscopic image to an image display apparatus in response to a request from said image display apparatus capable of viewing microscopic images; and
a provided image prediction function predicting the tile image highly likely to be requested by said image display apparatus based on hint information which is transmitted from said image display apparatus and which represents content of a microscopic image display process performed by said image display apparatus.

19. A computer program product stored on a non-transitory computer readable storage medium that when executed by a processor performs steps for causing a computer to implement:
a microscopic image acquisition control function controlling the acquisition of a microscopic image of a sample made of a plurality of tile images and picked up by a microscope, from an image management server managing microscopic images;
a display control function controlling the display, on a display screen, of said microscopic image acquired by said microscopic image acquisition control function;
a hint information creation function creating hint information representing content of a display process for displaying said microscopic image on said display screen, based on at least one of information displayed on said display screen regarding said microscopic image and user operation information about an operation performed by a user; and
a hint information transmission function transmitting said hint information created by said hint information creation function to said image management server.

20. An image management system comprising:
an image management server; and
an image display apparatus;
said image management server including
a microscopic image acquisition portion configured to acquire a microscopic image of a sample made of a plurality of tile images picked up by a microscope before placing the acquired microscopic image into a predetermined storage area,
a meta information creation portion configured to create meta information determining the microscopic image in accordance with a result of data analysis performed on said microscopic image acquired by said microscopic image acquisition portion,
an image provision processing portion configured to provide said meta information and said microscopic image to an image display apparatus in response to a request from said image display apparatus capable of viewing microscopic images, and
a provided image prediction portion configured to predict the tile image highly likely to be requested by said image display apparatus based on hint information which is transmitted from said image display apparatus and which represents content of a microscopic image display process performed by said image display apparatus, and
said image display apparatus including
a microscopic image acquisition control portion configured to control the acquisition of said microscopic image from said image management server,
a display control portion configured to control the display, on a display screen, of said microscopic image acquired by said microscopic image acquisition control portion,
a hint information creation portion configured to create hint information representing content of a display process for displaying said microscopic image on said display screen, based on at least one of information output from said display control portion and displayed on said display screen regarding said microscopic image and user operation information about an operation performed by a user, and
a hint information transmission portion configured to transmit said hint information created by said hint information creation portion to said image management server.

* * * * *